(12) United States Patent
Enomoto

(10) Patent No.: US 9,288,452 B2
(45) Date of Patent: Mar. 15, 2016

(54) APPARATUS FOR CONTROLLING IMAGE CAPTURING DEVICE AND SHUTTER

(71) Applicant: PANASONIC CORPORATION, Osaka (JP)

(72) Inventor: Hirofumi Enomoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 14/086,193

(22) Filed: Nov. 21, 2013

(65) Prior Publication Data

US 2015/0138364 A1    May 21, 2015

(51) Int. Cl.
  *H04N 5/238* (2006.01)
  *H04N 7/18* (2006.01)
  *H04N 5/232* (2006.01)

(52) U.S. Cl.
  CPC ........... *H04N 7/188* (2013.01); *H04N 5/23203* (2013.01)

(58) Field of Classification Search
  CPC ...................... H04N 19/132; G08B 13/19686
  See application file for complete search history.

(56) References Cited

U.S. PATENT DOCUMENTS

| 8,123,419 B2 | 2/2012 | Cirker | |
| 2005/0128314 A1* | 6/2005 | Ishino | 348/222.1 |
| 2008/0224862 A1 | 9/2008 | Cirker | |
| 2009/0080878 A1* | 3/2009 | Cirker | 396/433 |
| 2009/0160673 A1 | 6/2009 | Cirker | |
| 2010/0019927 A1 | 1/2010 | Cirker | |
| 2010/0220192 A1 | 9/2010 | Cirker | |
| 2011/0103786 A1 | 5/2011 | Cirker | |
| 2012/0113263 A1 | 5/2012 | Cirker | |
| 2012/0236112 A1* | 9/2012 | Cilia | 348/36 |
| 2012/0314063 A1* | 12/2012 | Cirker | 348/143 |
| 2015/0093102 A1* | 4/2015 | Oguchi et al. | 396/435 |

* cited by examiner

*Primary Examiner* — Gary C Vieaux
(74) *Attorney, Agent, or Firm* — Greenblum & Bernstein, P.L.C.

(57) ABSTRACT

A monitoring apparatus is provided for controlling an image capturing device and a shutter which limits a capturing area of the image capturing device. The monitoring apparatus includes a capturing area controller, configured to transmit a first control signal to cause the image capturing device to capture an image in an actual capturing area of the image capturing device, and a shutter controller, configured to transmit a second control signal to open the shutter after the first control signal is transmitted. The actual capturing area of the image capturing device is selected from a capturable area of the image capturing device in accordance with first information which is sensed by a sensor device.

19 Claims, 15 Drawing Sheets

FIG. 6

| | CAMERA 200A (IP ADDRESS: IpA) | CAMERA 200B (IP ADDRESS: IpB) | CAMERA 200C (IP ADDRESS: IpC) | CAMERA 200D (IP ADDRESS: IpD) | CAMERA 200E (IP ADDRESS: IpE) |
|---|---|---|---|---|---|
| SENSOR 510A1 | PRESET AP1 | PRESET BP2 | PRESET CP2 | PRESET DP1 | PRESET EP4 |
| SENSOR 510A2 | PRESET AP3 | PRESET BP3 | PRESET CP1 | | PRESET EP2 |
| SENSOR 510C1 | PRESET AP3 | PRESET BP3 | PRESET CP1 | | PRESET EP2 |
| SENSOR 510C2 | PRESET AP2 | PRESET BP4 | PRESET CP4 | PRESET DP3 | PRESET EP3 |
| SENSOR 510E1 | | PRESET BP1 | PRESET CP3 | PRESET DP2 | PRESET EP1 |
| SENSOR 510E2 | PRESET AP2 | PRESET BP4 | PRESET CP4 | PRESET DP3 | PRESET EP3 |

T11

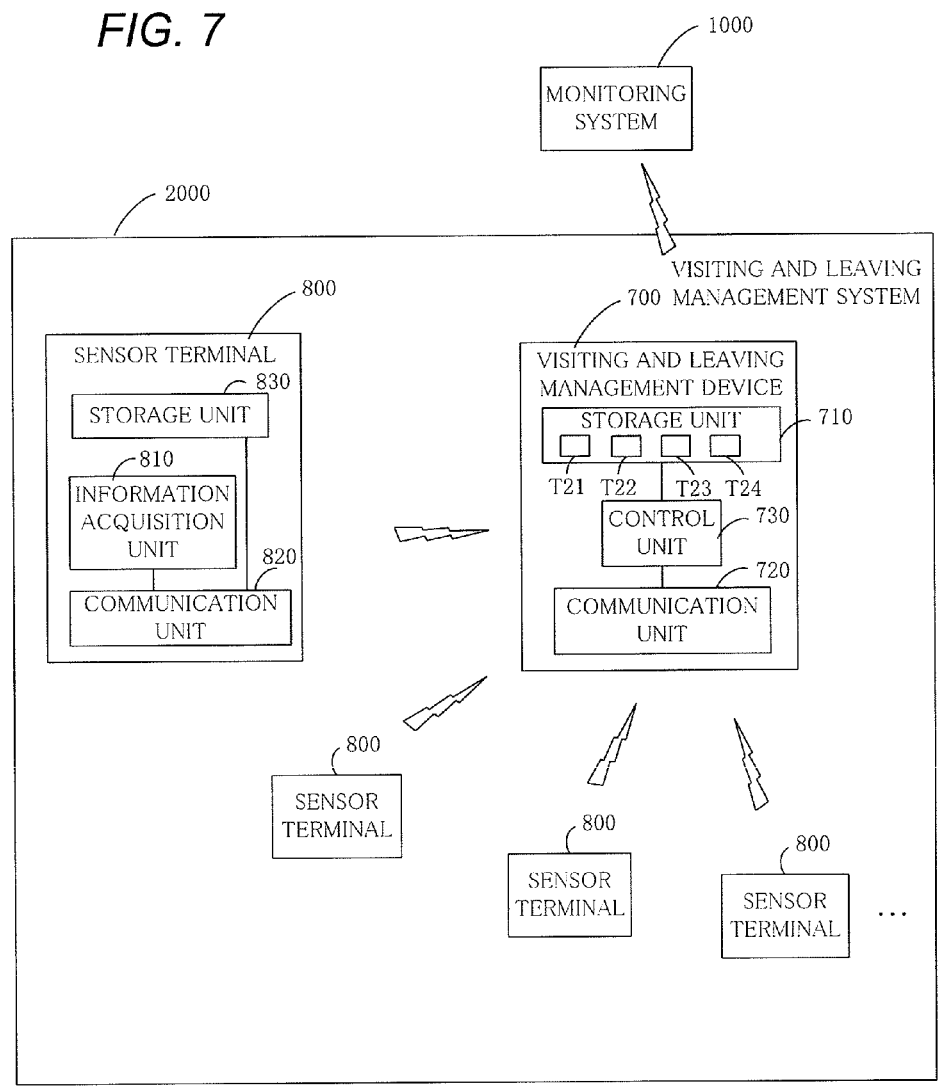

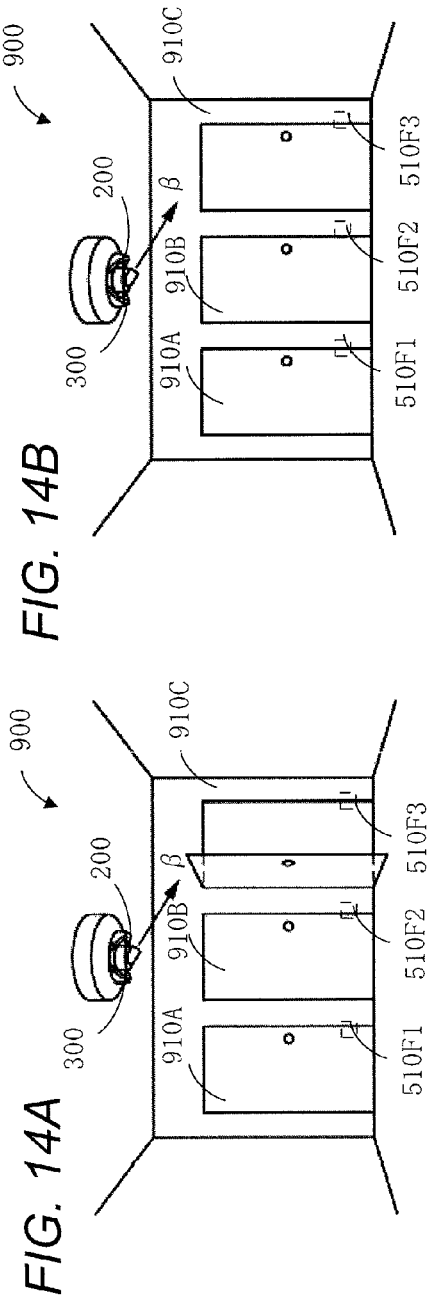
FIG. 14A
FIG. 14B
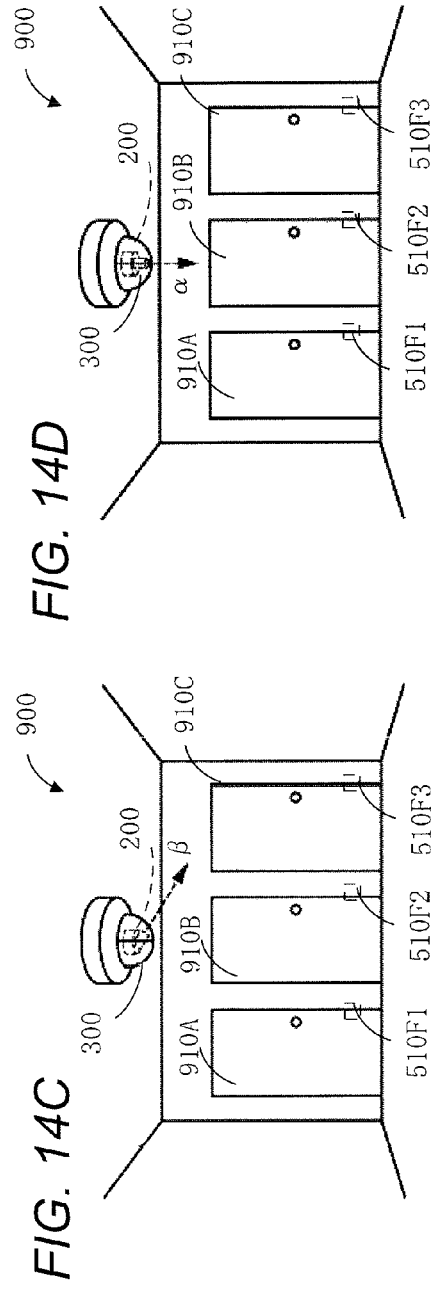
FIG. 14C
FIG. 14D

APPARATUS FOR CONTROLLING IMAGE CAPTURING DEVICE AND SHUTTER

BACKGROUND

1. Technical Field

The present invention relates to an apparatus for controlling an image capturing device and a shutter.

2. Background Art

In a related art, a camera system that includes a camera device and a shutter which covers the camera device, and exposes or obstructs the camera lens depending on the opening and closing of the shutter, is known. In the camera system, in a case where the shutter is in a closed state, the camera lens is obstructed and privacy of a person who is present in the image capturing area of the camera device can be protected. In a case where the shutter is in an open state, the camera lens is exposed and an image of a subject that is present in the image capturing area of the camera device is captured, and then security can be protected.

SUMMARY

In the camera system of the related art, it is insufficient to protect the privacy or to secure the security.

An aspect of the present invention provides an apparatus for controlling a control order of an image capturing device and shutter which limits a capturing device of the image capturing device.

According to the aspect of the present invention, it is possible to improve the level of protecting the privacy or ensuring the security.

BRIEF DESCRIPTION OF THE DRAWINGS

FIG. 6 is a schematic diagram illustrating an example of an information table which shows the relationship between each sensor and a preset position of each camera device in the embodiment.

FIG. 7 is a block diagram illustrating a configuration example of a visiting and leaving management system in the embodiment.

FIGS. 14A, 14B, 14C and 14D are schematic diagrams illustrating examples of PTZ operation timing of the camera device and closing timing of the shutter in the embodiment.

DETAILED DESCRIPTION

Hereinafter, an embodiment of the present invention will be described with reference to the drawings.

Figure 1:
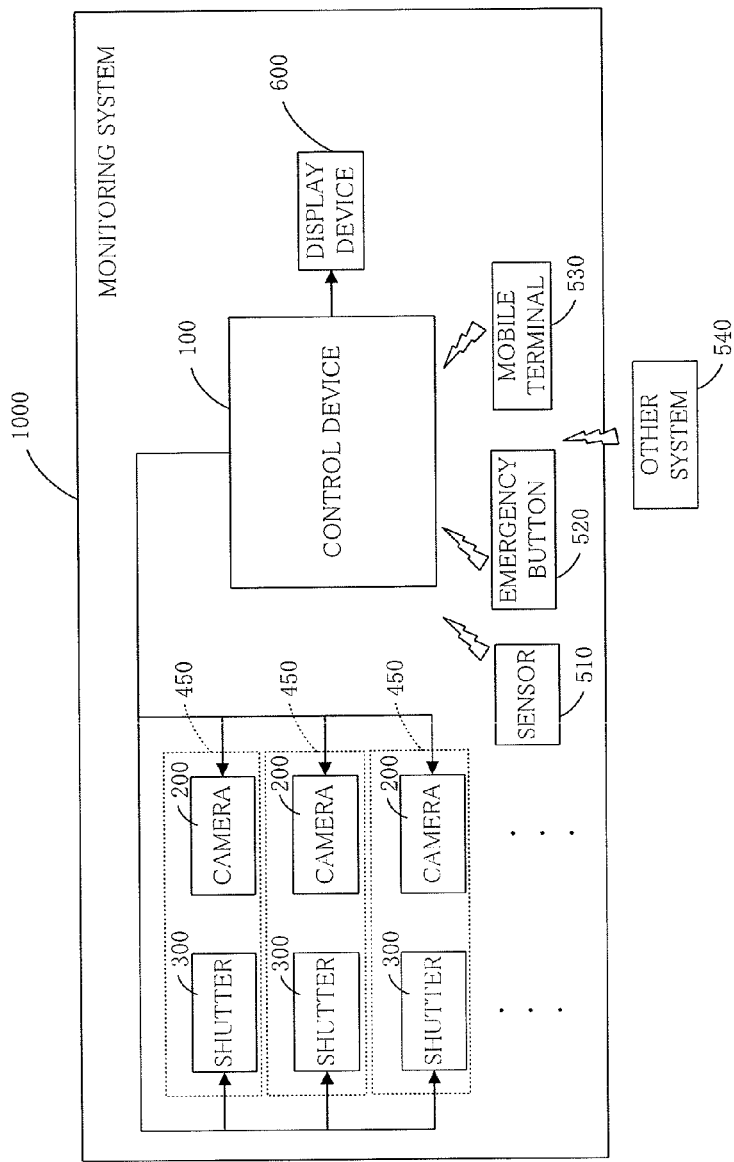
FIG. 1 is a block diagram illustrating a configuration example of a monitoring system in an embodiment.

FIG. 1 is a block diagram illustrating a configuration example of a monitoring system 1000 in the embodiment. The monitoring system 1000 includes a control device 100, a camera device 200, a shutter 300, a sensor 510, an emergency button 520, a mobile terminal 530, and a display device 600. The sensor 510, the emergency button 520, or the mobile terminal 530 can be omitted.

The control device 100 is, for example, disposed in the monitoring center and operates as a monitoring server. Alternatively, the control device 100 may be, for example, disposed for each camera device 200 or for each predetermined area where one or more camera devices 200 are arranged, and may be in cooperation with the central server of the monitoring center.

The camera device 200 is installed on the wall or ceiling of, for example, various facilities, a predetermined room in the facilities, or a predetermined area of the room in the facilities. The camera device 200 is, for example, capable of rotating in a panning direction and in a tilting direction, and captures an image of a subject which is present in a predetermined area. The camera device 200, for example, includes an omni-directional camera and a PTZ camera and operates as a network camera.

The PTZ camera as an example of the camera device 200 is a camera capable of changing the image capturing area (image capturing direction and zoom factor) by a PTZ operation. The PTZ operation is an operation that includes at least one of panning (P), tilting (T), and zooming (Z). In addition, the PTZ camera is controlled in PTZ by the control device 100. The PTZ control is a control that includes at least one of the panning control (P), the tilting control (T), and the zooming control (Z).

The omni-directional camera as an example of the camera device 200 captures an omni-directional image in all area.

The omni-direction (all direction) means, for example, all around (360 degrees) of the camera device 200 (for example, all direction of planes along the X-Y plane). In the omni-directional camera, the PTZ operation is implemented by software. An arbitrary area in the capturable area of the omni-directional camera is masked (unselected) by the control device 100 or the camera device 200 after the image capturing in the omni-directional image capturing area.

The shutter 300 is driven by a drive member in response to the instruction signal from the control device 100 and then opened and closed. Therefore, the shutter 300 limits the image capturing area captured by the camera device 200. Namely, the image capturing area is narrowed when the shutter 300 closes, and the image capturing area is widened when the shutter 300 opens.

The shutter 300, in a closed state, visually obstructs the front surface of the camera lens 260 (refer to FIG. 2A) in the image capturing direction of the camera device 200. As a result, the image capturing by the camera device 200 becomes impossible. In addition, the shutter 300, in an open state, visually opens the front surface of the camera lens 260 (refer to FIG. 2C) in the image capturing direction of the camera device 200. As a result, the image capturing by the camera device 200 becomes possible.

When the shutter 300 is in the open state, the camera lens 260 is in a state of being visible and recognizable by a person who is present in the area where the camera device 200 is disposed. The shutter 300 may be in an intermediate state in which a part of the image capturing area of the camera device 200 is limited (refer to FIG. 2B). In the intermediate state, there may be a plurality of states according to a degree of limitation.

Another example of the structure of the shutter 300 is, for example, described in U.S. Pat. No. 8,123,419, the contents of which are incorporated herein by reference.

One or more camera devices 200 and shutters 300 are respectively provided in the monitoring system 1000. For example, one shutter 300 is provided for each camera device 200. The shutter 300 may not be provided separately from the camera device 200, but the shutter 300 and the camera device 200 may be configured integrally with each other as illustrated by a reference numeral 450 in FIG. 1.

The sensor 510 includes various sensors that measure, for example, a mechanical, an electromagnetic, a thermal, an acoustic, or a chemical property in the predetermined area, and convert the measured result to a predetermined signal. The sensor 510 broadly includes, for example, a motion sensor, a smoke sensor (a smoke detector), a human sensor, a door opening and closing sensor, a window opening and closing sensor, an infrared sensor, a light sensor, a magnetic sensor, a temperature sensor, a voice sensor, a distance measuring sensor, a position sensor, and other sensors.

The emergency button 520 includes, for example, an emergency button fixedly installed in the predetermined area.

The mobile terminal 530 includes, for example, a smart phone, a personal digital assistant, a pendant microphone (a pendant-type infrared wireless microphone), various remote controllers, a portable emergency warning apparatus, a personal computer (PC), and other operational equipment.

Another system 540 includes, for example, a visiting and leaving management system that manages the visiting and leaving in a predetermined area, and an authentication system that authenticates a person to enter a predetermined area.

In a case where the sensor 510 detects predetermined information, the sensor 510, for example, informs the control device 100 of the predetermined information via the network.

The emergency button 520 is pressed by a person who is present in a predetermined area, and for example, informs the control device 100 of the information indicating that the emergency button 520 is pressed, via the network.

The sensor 510 or the emergency button 520 may be incorporated in the camera device 200. Alternatively, one or more sensors 510 or the emergency buttons 520 may be provided for each predetermined area, or one or more sensors 510 or the emergency buttons 520 may be provided for each camera device 200.

The mobile terminal 530 is, for example, possessed by a user, and includes a communication unit, operation unit, control unit, and various sensors. The mobile terminal 530 informs, for example, when predetermined information is detected or a predetermined button is pressed, the control device 100 of the predetermined information or the information indicating that the predetermined button is pressed, via the network.

The other system 540 includes, for example, various systems provided separately from the monitoring system 1000 (for example, the visiting and leaving management system 2000 (refer to FIG. 7) and the authentication system). The other system 540 informs the control device 100 in the monitoring system 1000, for example, of the information obtained by the processing in the other systems 540 via, for example, the network.

The information from at least one of the sensor 510, the emergency button 520, the mobile terminal 530, and the other systems 540 may be reported to the camera device 200 instead of being reported to the control device 100.

The display device 600 is disposed, for example, at the monitoring center. As a result, a security guard can visually recognize and monitor the predetermined area. The display device 600 may be, for example, a large screen display installed at the monitoring center or may be a small display on a mobile terminal which the security guard has for security activity. In the display device 600, for example, a plurality of areas may be displayed on the divided screen, or a captured image of one area combined with information about the area may be displayed on the screen.

For example, warning information may be displayed on the display device 600 in a case where a threat occurs in a predetermined area. Alternatively, the warning information may be transmitted to another communication device, and inform by, for example, image or sound, instead of being displayed on the display device 600.

Figure 2A:
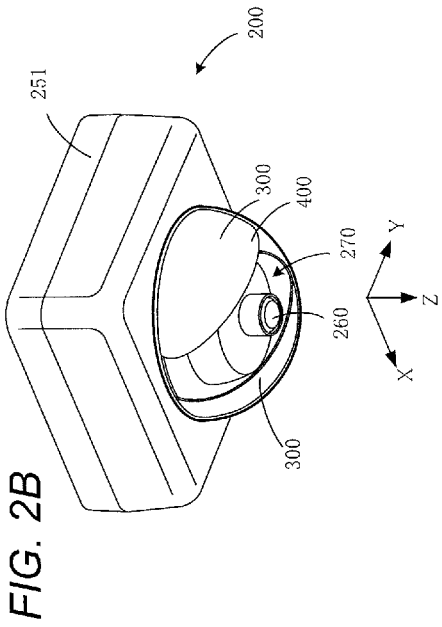
FIG. 2A is a perspective view illustrating an example of a structure in the vicinity of a camera device and a shutter when the shutter is in an open state in the embodiment.
Figure 2B:
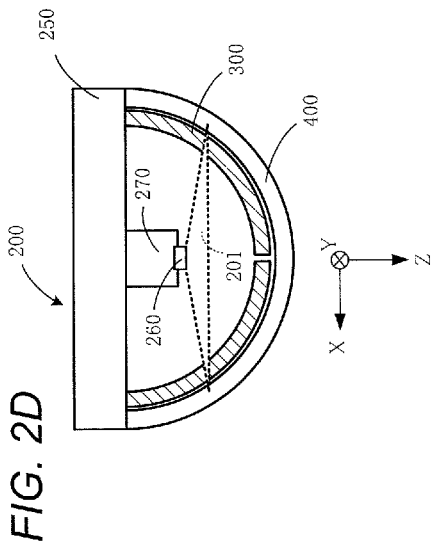
FIG. 2B is a perspective view illustrating an example of a structure in the vicinity of a camera device and a shutter when the shutter is in an intermediate state in the embodiment.
Figure 2C:
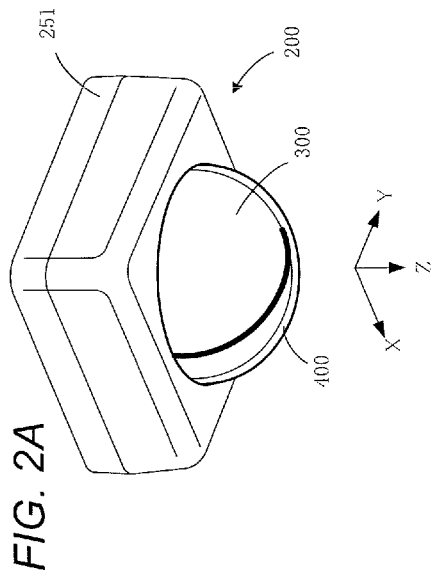
FIG. 2C is a perspective view illustrating an example of a structure in the vicinity of a camera device and a shutter when the shutter is in the closed state in the embodiment.
Figure 2D:
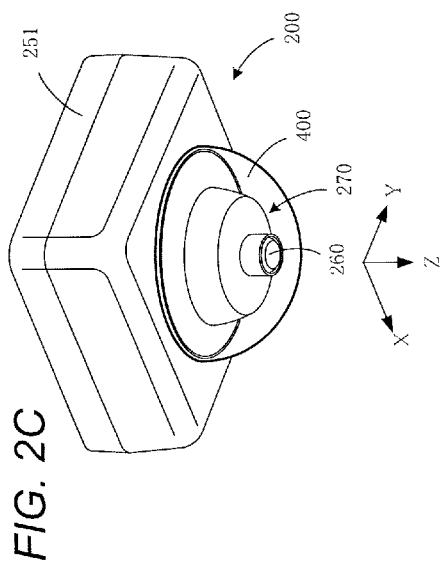
FIG. 2D is a cross-sectional view illustrating an example of a structure in the vicinity of a camera device and a shutter in the embodiment.

Next, an example of a structure in the vicinity of the camera device 200 and the shutter 300 will be described. FIGS. 2A to 2D are perspective views illustrating the structure in the vicinity of the camera device 200 and the shutter 300. FIG. 2A illustrates a case of the shutter 300 being in an open state. FIG. 2B illustrates a case of an intermediate state where the shutter 300 is in the state between the open state and the closed state. FIG. 2C illustrates a case of the shutter 300 being in a closed state. FIG. 2D is a cross-sectional view illustrating the example of the structure in the vicinity of the camera device 200 and the shutter 300 illustrated in FIG. 2A.

In FIGS. 2A to 2D, the camera device 200 includes at least an optical unit 270 and a camera base 250. The camera device 200 is covered with a housing 251 and a transparent cover 400. The camera device 200 is installed and fixed, for example on the wall or ceiling in a predetermined area.

The optical unit 270 is mounted on the camera base 250 via a predetermined holding mechanism. The optical unit 270 includes a camera lens 260 and a lens holder. An unillustrated board is incorporated in the camera base 250. Various electronic components are mounted on the board. The electronic components include, for example, components for supplying a power to the components in the camera device 200, outputting some images, or executing image processing, and include a digital signal processor (DSP) as described later.

FIG. 2A illustrates the state of the shutter 300 being closed. In this case, since the shutter 300 has a substantially semispherical dome-shape, the optical unit 270 cannot be visually recognized from the surroundings. In addition, in a case where the shutter 300 is in the closed state, an image capturing area 201 of the camera device 200 is limited to the inside of the shutter 300, which is the state of the image capturing being impossible.

The open and closed state of the shutter 300 is changed by a drive member (not illustrated). In a case where the shutter 300 is in the open state by an operation of the drive member as illustrated in FIG. 2C, at least a part of the substantially dome-shaped shutter 300 is opened along the substantially semispherical surface from the front of the image capturing direction, and is accommodated, for example, in the camera base 250. In a case where the shutter 300 is in the open state, the optical unit 270 can be visually recognized from the front of the image capturing direction. In a case where the camera base 250 is mounted on the ceiling, for example, it means that the front of the image capturing direction is a downward direction (positive direction on a Z-axis).

The camera base 250 may include a drive member for opening and closing the shutter 300. The board may be incorporated in the optical unit 270.

The transparent cover 400 is formed of, for example, a transparent material and a translucent material, and surrounds the shutter 300 which houses or exposes the camera device 200. The optical unit 270 is, even in a case where the shutter 300 is in the open state, surrounded by the camera base 250 (refer to FIG. 2A) and the transparent cover 400. The transparent material and the translucent material include, for example, polymethyl methacrylate (PMMA) and polycarbonate (PC).

By covering the optical unit 270 with the transparent cover 400, the camera device 200 can have, for example, excellent waterproofness, dust resistance and light resistance. By applying a hydrophilic coating on the surface of the transparent cover 400, it is possible to improve weather resistance of the transparent cover 400 itself. In addition, influence by the transparent cover 400 on the captured image is equal to or lower than a predetermined level, and it is possible to sufficiently secure the security by analyzing the captured image.

Next, the configuration example of the control device 100 will be described.

Figure 3:
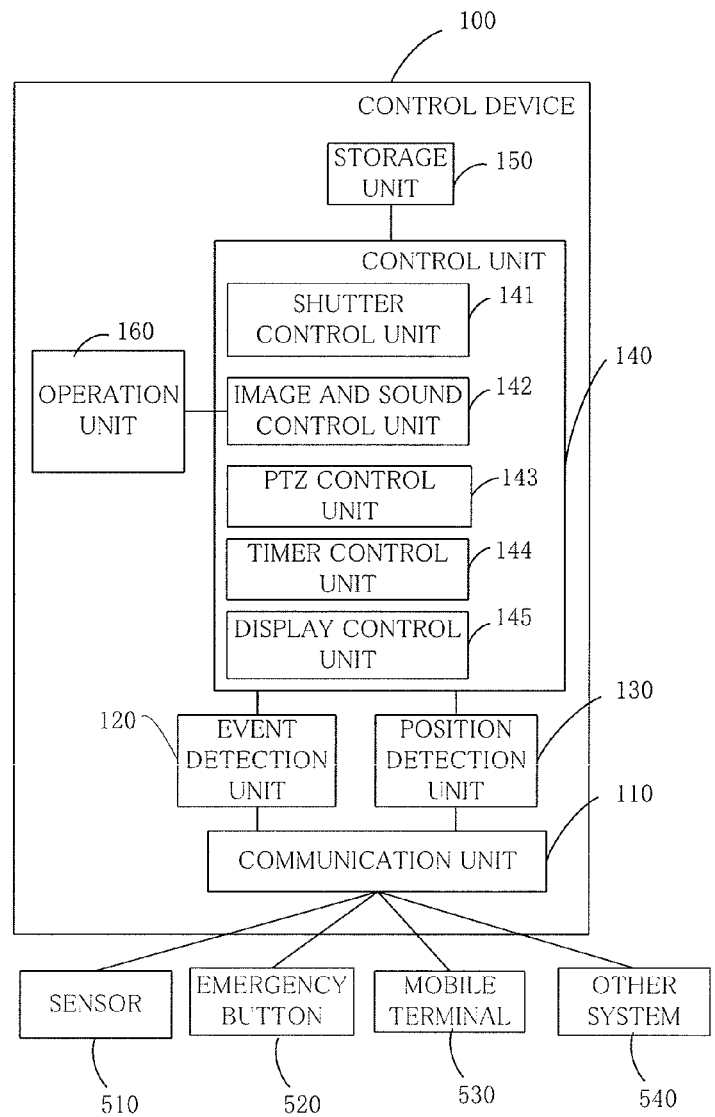
FIG. 3 is a block diagram illustrating a configuration example of a control device in the embodiment.

FIG. 3 is a block diagram illustrating the configuration example of the control device 100. The control device 100 includes a communication unit 110, an event detection unit 120, a position detection unit 130, a control unit 140, a storage unit 150, and an operation unit 160.

The communication unit 110 communicates various kinds of information, for example, with the sensors 510, the emergency button 520, the mobile terminal 530, or the other system 540. The communication unit 110 may communicate via the wired network or via the wireless network. In addition, the communication unit 110 may perform communication such as infrared communication, short range communication, and others.

The communication unit 110 receives the measured information measured by the sensors 510 or information indicating that the emergency button 520 is pressed. In addition, for example, the communication unit 110 receives the information detected by the mobile terminal 530 or the information indicating that a predetermined button is pressed. In addition, the communication unit 110 receives the information obtained by a processing in the other system 540.

The event detection unit 120 detects an event of opening and closing of the shutter 300 based on information received by the communication unit 110 from each device. The event includes, for example, an opening event for opening the shutter 300 and a closing event for closing the shutter 300. For example, the opening event is detected in a case where the threat level is comparatively high, and the closing event is detected in a case where the threat level is comparatively low. The state where the threat level is comparatively high includes, for example, a state where the sensor 510 reacts, and the state where the threat level is comparatively low includes, for example, a state where the sensor 510 does not react.

The event detection unit 120 determines that it is the opening event in a case where, for example, the emergency button 520 is pressed and the emergency warning is received by the communication unit 110 and in a case where information of an authentication error is received by the communication unit 110. In addition, the event detection unit 120 determines that it is the opening event in a case where, for example, a suspicious person enters the predetermined area (for example, in a classroom) and the information is reported by a teacher's mobile terminal. In addition, the event detection unit 120 determines that it is the opening event in a case where, for example, a suspicious person is detected in the visiting and leaving management system or in a case where an authentication error is detected in the authentication system.

In addition, the event detection unit 120 determines that it is the closing event in a case where, for example, the teacher in class requests via a smart phone for the shutter 300 to be closed for the protection of the privacy, and the request signal is received by the communication unit 110. In addition, the event detection unit 120 determines that it is the closing event in a case where a predetermined amount of time has passed since the opening event is detected (received).

The position detection unit 130 identifies a device that transmits the information received by the communication unit 110, and detects a position where the device exists or is installed. The position may be detected, for example, using an Internet Protocol (IP) address of the camera device 200 arranged in a predetermined area or a Media Access Control (MAC) address. In addition, the position may be detected using a host name that is uniquely given to the camera device 200. In addition, for example, in a case where the device is a mobile device, the position may be detected using the Global Positioning System (GPS).

The control unit 140 integrally administrates each unit in the control device 100. In addition, the control unit 140 includes a shutter control unit 141, an image and sound control unit 142, a PTZ control unit 143, a timer control unit 144, and a display control unit 145. The control unit 140 realizes various functions by, for example, a control program stored in the storage unit 150 being executed by a CPU.

The shutter control unit 141 controls the opening and closing of the shutter 300. The image and sound control unit 142 controls such that the image captured by the camera device 200 is recorded, or the voice collected by the microphone is recorded.

The PTZ control unit 143 instructs the camera device 200 to perform, for example, the PTZ control in a predetermined timing. For example, the PTZ control unit 143 controls the image capturing area or the image capturing direction of the camera device 200 according to the position information of the sensor 510 which detects a predetermined event.

The timer control unit 144 measures, for example, current time or any period of time. For example, the display control unit 145 generates a display screen from the image captured by the camera device 200, and instructs the display device 600 so as to display the display screen, according to the screen size of the display device 600.

The storage unit 150 stores various kinds of information, various programs, and information about various tables. In addition, for example, information of the image captured by the camera device 200 and information of the voice collected by the camera device 200 may be obtained from the camera device 200 via the communication unit 110, and may be stored in the storage unit 150.

The operation unit 160 receives various operations. As an operation unit 160, which can instruct the control unit 140, for example, a key input unit, a predetermined button, a mouse, a keyboard, a microphone, and a touch panel can be considered.

Figure 4:
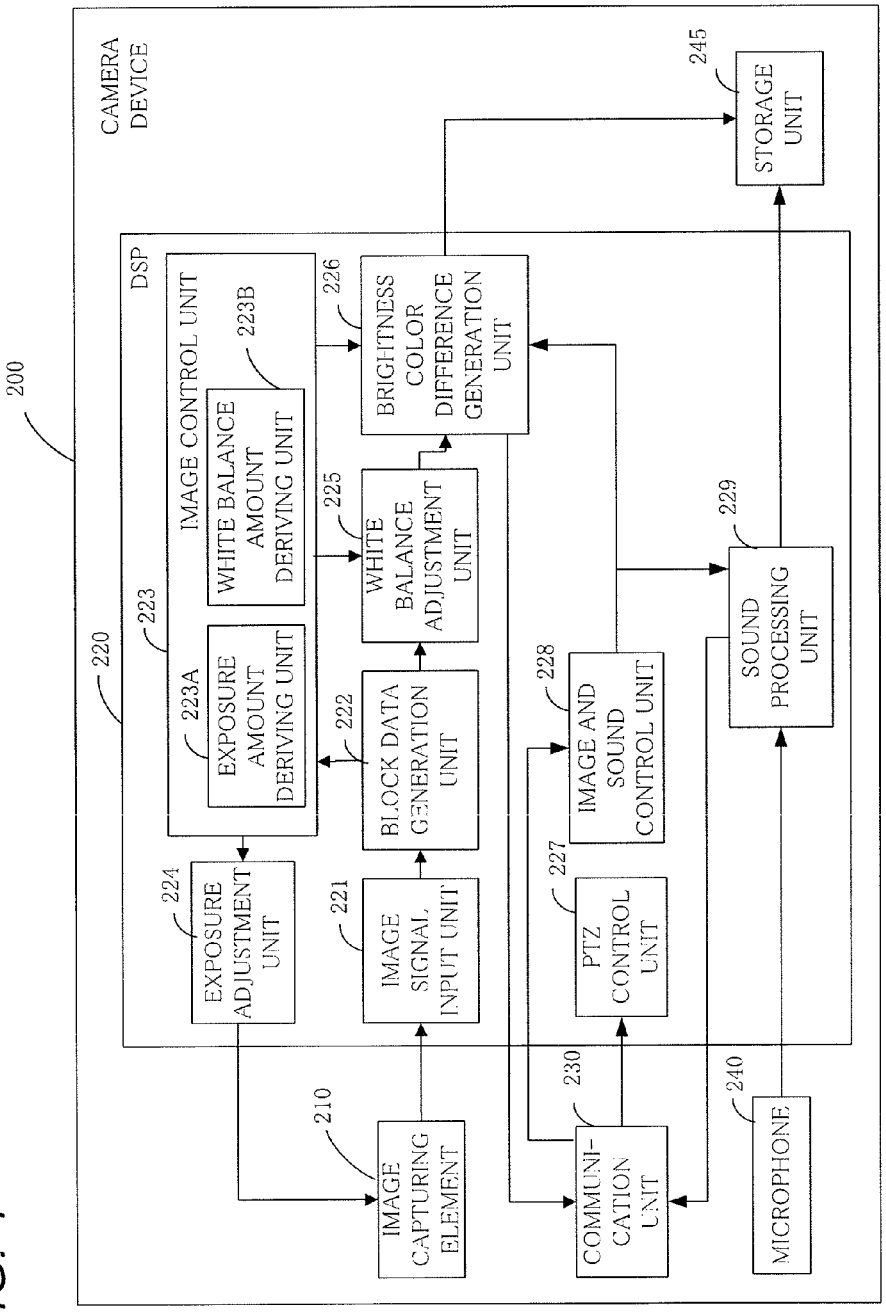
FIG. 4 is a block diagram illustrating a configuration example of a camera device in the embodiment.

Next, a configuration example of the camera device 200 will be described. FIG. 4 is a block diagram illustrating the configuration example of the camera device 200. The camera device 200 includes an image capturing element 210, a Digital Signal Processor (DSP) 220, and a communication unit 230.

The image capturing element 210 includes, for example, a Charge Coupled Device (CCD) or a Complementary Metal Oxide Semiconductor (CMOS) image sensor. The DSP 220 performs a predetermined signal processing with respect to the image signal obtained from the image capturing element 210.

The communication unit 230 is connected to the control device 100 via the network, and communicates with the control device 100 on various kinds of information. The network may be either a wired network or a wireless network. The communication unit 230 receives, for example, information about the direction of the camera device 200, or control information (for example, panning control information, tilt control information or zoom control information) which controls the image capturing area, from the control device 100.

In addition, the communication unit 230 may receive, for example, detection information or information about the detection result from the sensor 510, the emergency button 520, the mobile terminal 530, and at least one of the other systems 540. In this case, the communication unit 230 transmits the received information to the control device 100, and the opening and closing control of the shutter 300 is performed by the control device 100.

In the present embodiment, the shutter 300 is controlled by the control device 100. Alternatively, the shutter 300 may be controlled by the camera device 200. In this case, the control signal is transmitted to the shutter 300 from the communication unit 230, and the opening and closing control of the shutter 300 is performed.

The microphone 240 acquires a sound signal (for example, a voice) surrounding the microphone 240 to convert the signal to an electric signal.

The storage unit 245 stores various kinds of information, various programs, and information about various tables. In addition, the information about the camera device 200 kept in the control device 100 may be kept in the storage unit 245 of the camera device 200.

The DSP 220 includes an image signal input unit 221, a block data generation unit 222, an image control unit 223, an exposure adjustment unit 224, a white balance adjustment unit 225, and a brightness color difference generation unit 226. In addition, the DSP 220 includes a PTZ control unit 227, an image and sound control unit 228, and a sound processing unit 229.

The image signal input unit 221 receives an image signal from the image capturing element 210. The block data generation unit 222 divides all of the pixels of the image capturing element 210 into a plurality of blocks with a predetermined size, adds a pixel value to a color filter (each RGB filter) for each divided block, and generates block data.

The image control unit 223 includes, for example, an exposure amount deriving unit 223A and a white balance amount deriving unit 223B. The exposure amount deriving unit 223A receives the block data from the block data generation unit 222 and derives (for example, calculates) an exposure amount based on the block data. The white balance amount deriving unit 223B receives the block data from the block data generation unit 222 and derives a white balance amount based on the block data.

The exposure adjustment unit 224 adjusts the exposure amount of the image capturing element 210 using the exposure amount derived by the exposure amount deriving unit 223A. The white balance adjustment unit 225 adjusts the white balance of the block data using the white balance amount derived by the white balance amount deriving unit 223B.

The brightness color difference generation unit 226 generates brightness data Y, and color difference data Cb and Cr as exemplified below is adjusted, from the block data (RGB data) of the white balance.

$$Y=0.299 \times R+0.587 \times G+0.114 \times B$$

$$Cb=-0.169 \times R-0.331 \times G+0.500 \times B$$

$$Cr=0.500 \times R-0.419 \times G-0.081 \times B$$

The PTZ control unit 227 controls, for example, the direction of the camera device 200 based on the control information received by the communication unit 230. For example, the PTZ control unit 227 may control the direction in a horizontal direction of the camera device 200 based on the panning control information from the control device 100. In addition, the PTZ control unit 227 may control the direction in a vertical direction of the camera device 200 based on the tilt control information from the control device 100. The PTZ control unit 227 causes, for example, a motor (not illustrated) to rotate and causes the camera device 200 to pan or tilt for each predetermined angle.

In addition, the PTZ control unit 227 may control the image captured by the camera device 200 so as to be enlarged (zoom-in) or reduced (zoom-out) based on the zoom control information from the control device 100. In a case where the direction of the camera device 200 is controlled, the direction of the entire camera device 200 may be controlled or the direction of the camera lens 260 of the camera device 200 may be controlled.

In a case where the camera device 200 is an omni-directional camera, the PTZ control in the camera device 200 is implemented in software.

The image and sound control unit 228, for example, controls such that the image captured by the image capturing element 210 is recorded and the voice collected by the microphone 240 is recorded in the storage unit 245, according to the instruction signal (control signal) from the control device 100. In addition, the image and sound control unit 228, for example, controls such that the recording of the captured image is stopped and the recording of the collected voice is stopped according to the instruction signal from the control device 100.

The recorded image or sound information to be stored in the storage unit 245 may be stored in other memory than the storage unit 245. For example, the information may be stored in an external storage medium such as an SD card mounted on the camera device 200 or the like. In addition, for example, the information may be transmitted to the control device 100 and be kept in the control device 100.

The sound processing unit 229 performs a predetermined signal processing with respect to an electric signal from the microphone 240.

Moreover, the case where the microphone 240 collecting the surrounding sound in the predetermined area is included in the camera device 200 is illustrated. However, the microphone 240 may be provided separate from the camera device 200.

Next, the environment for installation of the camera device 200 will be described.

The camera device 200 is, for example, installed on the ceiling or on the wall surface in a predetermined privacy-sensing area where both the security securing and the privacy protection are required. The privacy-sensing area is one of the predetermined areas. The privacy-sensing area is, for example, a part or the whole of a company, a classroom, a restroom, a dressing room, a library, a locker room, or a conference room.

In each privacy-sensing area, a privacy threshold value is assigned depending on importance of the privacy protection. For example, when the importance of the privacy protection is higher, a larger value is assigned as a privacy threshold value, and when the importance of the privacy protection is lower, a smaller value is assigned as a privacy threshold value. For example, in the privacy-sensing area such as in a restroom or a dressing room, a comparatively larger privacy threshold value is assigned, and in the privacy-sensing area such as in a library, a comparatively smaller privacy threshold value is assigned. When the privacy threshold value assigned is comparatively large, for example, in a case where a predetermined event is detected by a plurality of sensors 510, the shutter 300 is merely opened but the captured image is not recorded. Thus the privacy can be protected as much as possible. In addition, when the privacy threshold value assigned is comparatively small, for example, even in a case where a predetermined event is detected by one sensor 510, the captured image is recorded while the shutter 300 is opened. Thus, the privacy is not protected compared to the case where the privacy threshold value is large.

For example, for each privacy-sensing area, one or more camera devices 200 are installed. In addition, the camera device 200 for which the privacy-sensing area is included in the image capturing area may be installed outside the privacy-sensing area.

In addition, the sensor 510 and the emergency button 520 may be installed, for example, in the privacy-sensing area. The mobile terminal 530 may, for example, be owned by a user located in the privacy-sensing area. At least a part of the other system 540, for example, may or may not be installed in the privacy-sensing area.

The image capturing area of the camera device 200 includes, for example, at least a part of the detection range of one or more sensors 510 installed in a fixed manner or at least a part of the target warning range of the emergency button 520. Each camera device 200 is preset so that the direction of each camera device 200 is adjusted in such a manner that the predetermined privacy-sensing area is included in the image capturing area. In addition, the number of preset position of each camera device 200 may be more than one, for example, the preset position may be prepared in advance for each sensor 510 which detects the information regarding the occurrence of an abnormality. In this case, for example, the sensor 510 which detects the information regarding the occurrence of the abnormality and the information regarding the preset position of the camera device 200 are stored in the control device 100 or in each camera device 200 in advance in association with each other.

Figure 5:
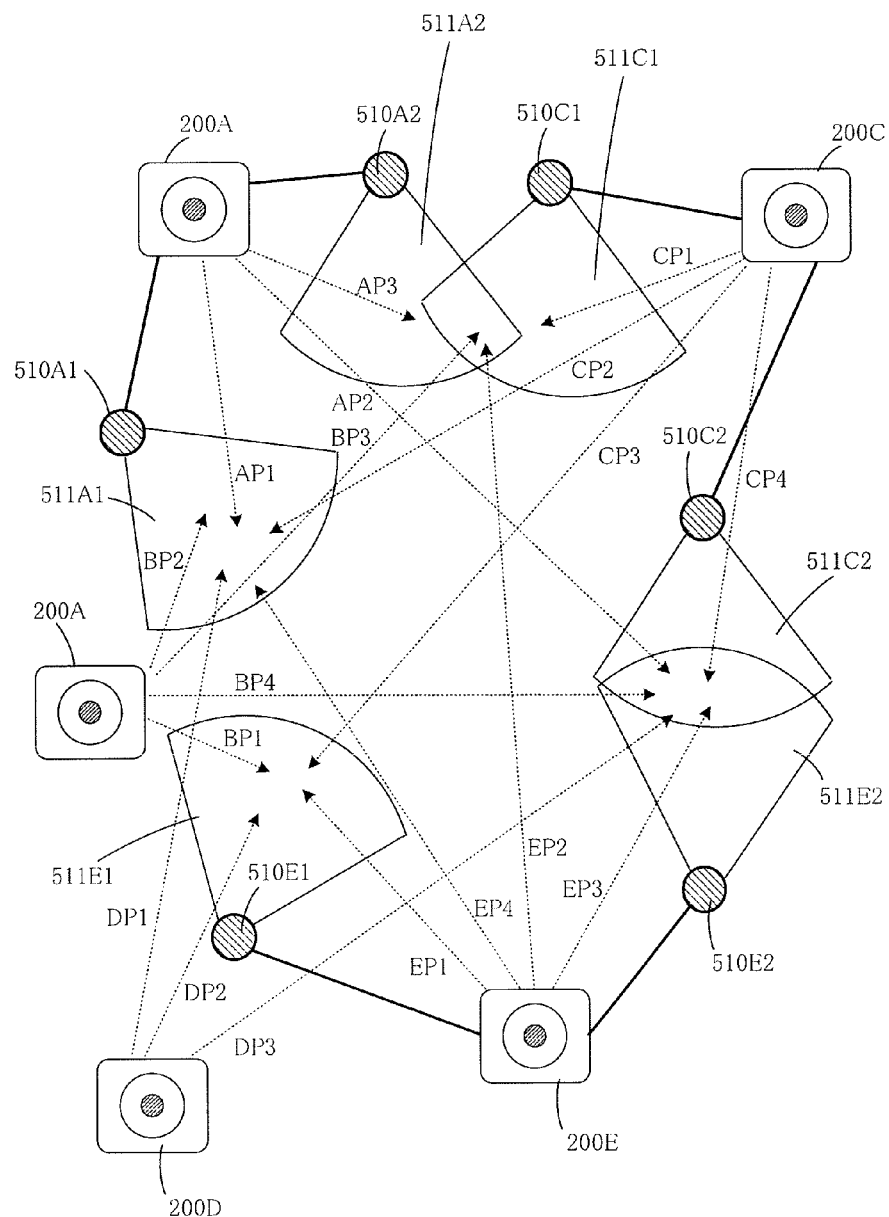
FIG. 5 is a schematic diagram illustrating an example of an arrangement of camera devices, an example of an arrangement of sensors, an example of image capturing areas of the camera devices, and an example of detection ranges of the sensors in the embodiment.

FIG. 5 is a schematic diagram illustrating an arrangement example of the camera devices 200, an arrangement example of the sensors 510, an example of image capturing areas of the camera devices 200, and an example of detection ranges of the sensors 510. As illustrated in FIG. 5, five camera devices 200 (200A to 200E) and 6 sensors (510A1, 510A2, 510C1, 510C2, 510E1, and 510E2) are installed in the privacy-sensing area. Here, a description mainly related to the camera device 200A will be given.

In FIG. 5, the sensors 510A1 and 510A2 are connected to and three preset positions AP1 to AP3 are set to the camera device 200A. The sensors 510C1 and 510C2 are connected to and four preset positions CP1 to CP4 are set to the camera device 200C. The sensors 510E1 and 510E2 are connected to and four preset positions EP1 to EP4 are set to the camera device 200E. Moreover, the sensor 510 is not connected to either of the camera devices 200B or 200D, and four preset positions BP1 to BP4 are set to the camera device 200B and three preset positions DP1 to DP3 are set to the camera device 200D.

For example, the preset position AP1 is corresponding to the detection range 511A1 of the sensor 510A1, preset position AP2 is corresponding to the detection ranges 511C2 and 511E2 of the sensors 510C2, 510E2, respectively, and the preset position AP3 is corresponding to the detection ranges 511A2 and 511C1 of the sensors 510A2 and 510C1, respectively.

That is, when the camera lens 260 of any one of the camera devices 200A to 200E is turned to the preset position AP1, it is possible to capture an image including the detection range 511A1 of the sensor 510A1. In addition, when the camera lens 260 of any one of the camera devices 200A to 200E is turning to the preset position AP2, it is possible to capture an image including the detection ranges 511C2 and 511E2 of the sensors 510C2 and 510E2, respectively. In addition, when the camera lens 260 of any one of the camera devices 200A to 200E is turning to the preset position AP3, it is possible to capture an image including the detection ranges 511A2 and 511C1 of the sensors 510A2 and 510C1.

In FIG. 5, a case where a plurality of the camera devices 200 and the sensors 510 are installed in one privacy-sensing area is illustrated. Alternatively, for example, the privacy-sensing area may be divided by a wall surface, and the camera devices 200 may be installed for each divided privacy-sensing area.

FIG. 6 is a schematic diagram illustrating an example of an information table T11 which indicates the relationship between each sensor 510 and a preset position of each camera device 200. The information table T11 is stored in the storage unit 150.

The information table T11 holds, for example, the identification information (for example, IP address) of each camera device 200A to 200E and the identification information (for example, sensor ID) of each sensor 510 in association with each other. The information table T11 includes, for example, information indicating that the preset position AP1 of the camera device 200A (IP address: IpA) is corresponding to the detection range 511A1 of the sensor 510A1. In addition, the information table T11 includes information indicating that the preset position BP2 of the camera device 200B (IP address: IpB) is corresponding to the detection range 511A1 of the sensor 510A1. In addition, the information table T11 includes information indicating that the preset position CP2 of the camera device 200C (IP address: IpC) is corresponding to the detection range 511A1 of the sensor 510A1. In addition, the information table T11 includes information indicating that the preset position DP1 of the camera device 200D (IP address: IpD) is corresponding to the detection range 511A1 of the sensor 510A1. In addition, the information table T11 includes information indicating that the preset position EP4 of the camera device 200E (IP address: IpE) is corresponding to the detection range 511A1 of the sensor 510A1.

In addition, the control device 100 may hold an information table (not illustrated) in which a sensor of another camera having a common detection range is associated with each sensor 510 (for example, sensor 510A1 and 510A2). In the information table, the sensor 510C1 of the camera device 200C is in associated with the sensor 510A2, the IP address of the camera device 200C is stored.

In FIG. 5, a case where the sensors 510 are connected to the camera devices 200 is illustrated. Alternatively, instead of the sensors 510, the emergency button 520, the mobile terminal 530, or the other system 540 may be connected thereto. In addition, at least two of the sensor 510, the emergency button 520, the mobile terminal 530, or the other system 540 may be mixed in the privacy-sensing area.

The detection range 511 may or may not be overlapped by a plurality of sensors 510. In addition, the image capturing area by a plurality of camera devices 200 may or may not be overlapped.

The control device 100 instructs the camera device 200 (for example, the camera device 200A), with reference to the information table T11, to capture the image of a detection range (for example, the detection range 511A1) where an abnormality is expected to occur, for example.

Next, as one example of the other system 540, the visiting and leaving management system 2000 will be described.

FIG. 7 is a block diagram illustrating a configuration example of a visiting and leaving management system 2000. The visiting and leaving management system 2000 includes, for example, a visiting and leaving management device 700 and a sensor terminal 800. The visiting and leaving management device 700 and one or more sensor terminals 800 are connected to each other via a network.

The visiting and leaving management device 700 manages at least one of the visitors who enter a predetermined area and the leaving persons who leave the predetermined area. Here, it is assumed that the visitors or the leaving persons have IC cards for the management of visiting and leaving, but not limited to the IC card. In addition, for example, the functions of IC cards may be incorporated in the mobile terminal. The sensor terminal 800 is installed inside or outside of the predetermined area where the visiting and leaving is managed.

The sensor terminal 800 includes an information acquisition unit 810, a communication unit 820, and a storage unit 830. The sensor terminal 800 includes, for example, a memory and a processor, and realizes various functions (for example, an IC card reading function, an information transmission function) by the CPU executing a control program stored in the memory. Moreover, each function may be realized by a dedicated hardware instead of the software.

The information acquisition unit 810 acquires various kinds of information. For example, the information acquisition unit 810 is a card reader, and reads the card ID stored in the IC card from the IC card which is held by the bearer of the IC card, and informs the communication unit 820.

The communication unit 820 communicates, for example, various kinds of information to the visiting and leaving management device 700 via a wired network or a wireless network. For example, the communication unit 820 transmits the information about the card ID from the information acquisition unit 810 and the information about the terminal ID which identifies the sensor terminal and is stored in the storage unit 830, to the visiting and leaving management device 700.

The visiting and leaving management device 700 includes a storage unit 710, a communication unit 720, and a control unit 730.

The storage unit 710 stores various kinds of information, various tables, and a control program. The storage unit 710 stores, for example, a sensor signal holding table T21, a card information holding table T22, a visitor information holding table T23, and a leaving information holding table T24. Adding, modifying, and removing data to and from the sensor signal holding table T21 and the card information holding table T22 are implemented based on the input to the operation unit (not illustrated).

The communication unit 720 communicates with another communication device or another system (for example, the monitoring system 1000) via a wired network or a wireless network. For example, with respect to the monitoring system 1000, the communication unit 720 transmits the information on whether or not a person exists in the predetermined area. In addition, with respect to the monitoring system 1000, when a person's visiting or leaving occurs in the predetermined area, the communication unit 720 may sequentially transmit the information on the visiting or leaving (for example, information on the visitor, the leaving person, the visiting time, the leaving time, the visiting area, and the leaving area).

The control unit 730 realizes, for example, various functions (for example, an authentication processing function, a visitor information generation function, and a leaving determination function) by an execution of the control program stored in the storage unit 710 by a CPU. Moreover, various functions may be realized by a dedicated hardware instead of the software. The information on visiting and leaving is held, for example, in the visitor information holding table T23 and the leaving information holding table T24.

The sensor information holding table T21 has information indicating a correspondence between each sensor and the area where each sensor is installed. The sensor information holding table T21 holds, for each sensor terminal 800, for example, information on the sensor ID, the installation area, the area ID, and the name of area in association with each other. The sensor information holding table T21 is referenced in the authentication processing.

The sensor ID is identification information which identifies the sensor terminal 800. The installation area indicates information about the location where the sensor terminal 800 is installed. The area ID is identification information which identifies the area where predetermined information is detected by the sensor terminal 800.

The card information holding table T22 has information indicating a correspondence between the IC card used for visiting and leaving and the area where the visiting and leaving is permitted by each IC card. The card information holding table T22 holds, for each IC card, for example, information on the card ID, the name, and the permitted area ID in association each other. The card information holding table T22 is referenced in the authentication processing.

The card ID is identification information which is recorded in the IC card and identifies the IC card. The name is an IC card bearer's name, for example. The permitted area ID is identification information which identifies the area where the visiting and leaving is permitted by the IC card.

The visitor information holding table T23 has information indicating a correspondence between each visitor and the area each visitor has entered. The visitor information holding table T23 holds, for each visitor, for example, information on the visitor card ID, the visitor's name, the visiting area ID, the visiting area name, and the visiting time in association with each other. The visitor information holding table T23, for example, is referenced in a case where the control unit 730 determines whether the visitor information is recorded or removed, and is updated according to the determination result.

The visitor card ID is identification information which identifies the IC card used when the visitor enters. The ID card is included in the card ID held in the card information holding table T22. The visitor's name is, for example, a name of the visitor. The visiting area ID is identification information which identifies the area where the visitor enters, and is an area ID held in the sensor information holding table T21 in association with the sensor ID of the sensor terminal 800 installed in the area. The visiting area name is the area name held in the sensor information holding table T21 in association with the corresponding area ID.

The leaving information holding table T24 has, for example, at the time point when the shutter 300 is opened, information indicating the leaving status of the visitor who has entered each area, at a predetermined time point. The leaving information holding table T24 holds, for each entering visitor when the shutter 300 is in the open state, the card ID, the name, the area ID, the area name, and the leaving information in association with each other. The leaving information holding table T24 is, for example, referenced when the control unit 730 determines the leaving, and is updated.

The visitor's card ID, the visitor's name and the visiting area name in the leaving information holding table T24, for example, are similar to the visitor's card ID, the visitor's name, and the visiting area name held in the visitor information holding table T23 at the time point when the shutter 300 is in the open state. In addition, the leaving information is information indicating whether the visitor has left or not.

The storage unit 710 may not include the leaving information holding table T24, and when the visitor has left, the control unit 730 may remove the information about the visitor who has left, from the visitor information holding table T23. Even in this case, a person in the area can be recognized.

Here, separately from the monitoring system 1000, a case of the visiting and leaving management system 2000 is described. Alternatively, the configuration units of the monitoring system 1000 and the configuration units of the visiting and leaving management system 2000 may be partly at least in common. For example, at least a part of the storage unit, the communication unit, the control unit, the area (the privacy-sensing area), and the sensor (the sensor terminal) may be partly shared in both systems.

Figure 8:
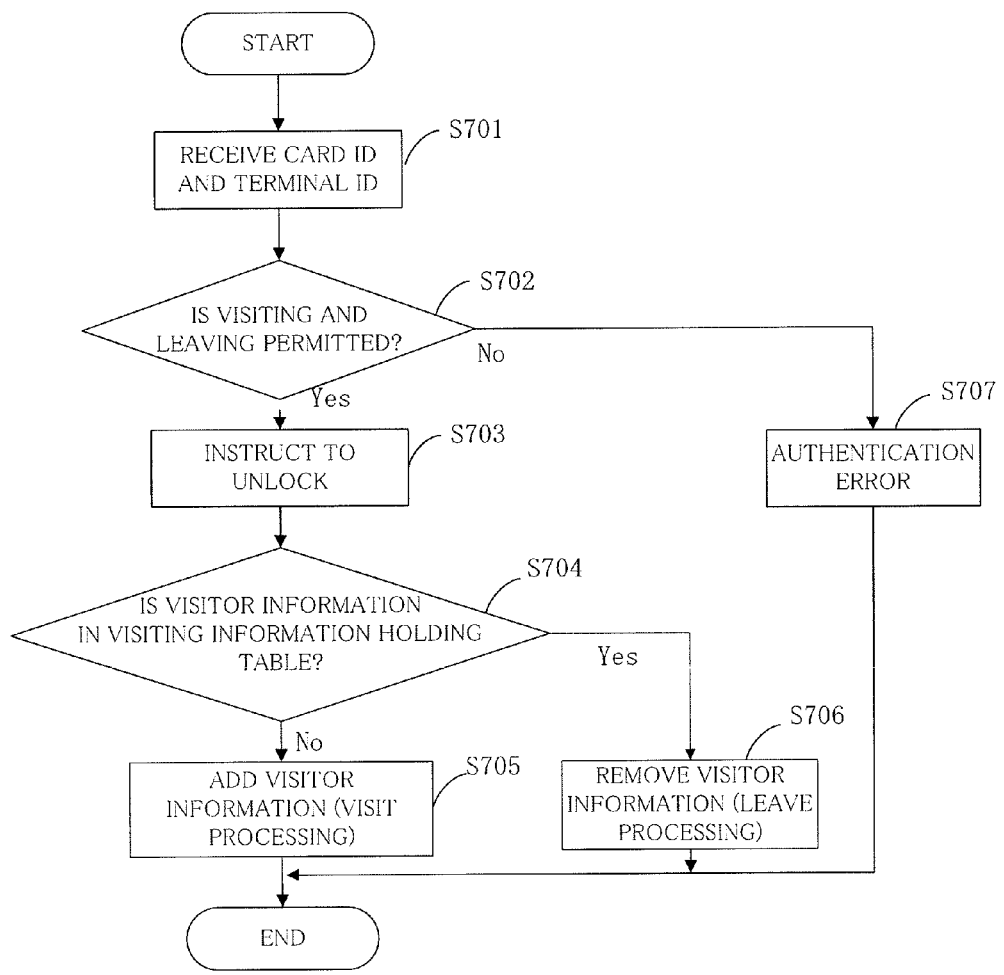
FIG. 8 is a flowchart illustrating an example of an operation of the visiting and leaving management system in the embodiment.

Next, an example of an operation of the visiting and leaving management device 700 will be described. FIG. 8 is a flowchart illustrating the example of the operation of the visiting and leaving management device 700.

First, the communication unit 720 receives the information about the card ID and the terminal ID from the sensor terminal 800 which the IC card approaches (S701).

Subsequently, the control unit 730 determines whether or not the visiting of the area where the sensor terminal 800 which the IC card approaches is installed or the leaving from such area is permitted (S702). For example, the control unit 730 determines whether or not the visiting and leaving is permitted in a case where the area ID held in the sensor information holding table T21 in association with the received terminal ID is included in the permitted area ID held in the card information holding table T22 in association with the received card ID. In a case where the visiting and leaving is not permitted, the control unit 730 determines the authentication error (S707), and the process in FIG. 8 ends.

In a case where the visiting and leaving is permitted, the communication unit 720 transmits, for example, an instruction to the sensor terminal to which the IC card approaches, to unlock the door provided at the predetermined area (S703).

Subsequently, the control unit 730 determines whether or not the visitor information which includes the received card ID and the area ID held in the sensor information holding table T21 in association with the received terminal ID are included in the visitor information holding table T23 (S704).

In a case where the visitor information is not included in the visitor information holding table T23, the control unit 730 adds the visitor information to the visitor information holding table T23, and the visiting process ends (S705).

On the other hand, in a case where the visitor information is included in the visitor information holding table T23, the control unit 730 removes the visitor information from the visitor information holding table T23, and the leaving process ends (S706).

Here, a case where the visitor information about the visitor already entered is removed as a leaving person is illustrated. Alternatively, the visiting and leaving may be determined by the terminal ID. For example, in a case where the IC card approaches the sensor terminal 800 installed in the area other than the predetermined area, the visiting and leaving management device 700 or the sensor terminal 800 may determine that the bearer of the IC card is visiting. In addition, in a case where the IC card approaches the sensor terminal 800 installed in the area within the predetermined area, the visiting and leaving management device 700 or the sensor terminal 800 may determine that the bearer of the IC card is leaving.

In this way, according to the visiting and leaving management system 2000, it is possible to grasp presence or absence of the visitor in the predetermined area. The visiting and leaving management system 2000 may provide the monitoring system 1000 with the information about the visitor in the predetermined area (for example, the information about the presence or the absence of the visitor at least a part of information included in the visitor information holding table T23) via the network. The control device 100 of the monitoring system 1000 acquires, for example, the information about the visitor from the visiting and leaving management system 2000, and may open and close the shutter 300 according to the presence or the absence of the visitor.

Next, the time table T12 held in the storage unit 150 of the control device 100 in the monitoring system 1000 will be described.

Figure 9:
FIG. 9 is a schematic diagram illustrating an example of a time table that includes information about the opening and closing of the shutter, an implementation state of the image recording, and an implementation state of sound recording in each time zone in the embodiment.

FIG. 9 is a schematic diagram illustrating an example of the time table T12. The time table T12 includes, for example, information about the opening and closing state of the shutter 300, the implementation state of the image recording, and the implementation state of sound recording in each time zone. The time table T12 is stored in the storage unit 150.

In FIG. 9, on holidays, the monitoring system 1000 sets the operation mode as a monitoring mode for the entire day (0:00 to 24:00), implements the sound recording, implements the image recording, and causes the shutter 300 to be in the open state. For example, in a case of monitoring an office, since it is estimated that employees may not be present in the office on holiday, priority to the security can be given in such a time zone.

In addition, as illustrated in FIG. 9, from 08:30 to 17:00 on weekdays, the monitoring system 1000 sets the operation mode as a non-monitoring mode, does not implement the sound recording, does not implement the image recording, and causes the shutter 300 to be in the closed state. For example, in a case of monitoring the office, since it is assumed that employees may be present in the office during work hours, priority to the privacy can be given in such a time zone.

In addition, as illustrated in FIG. 9, in 00:00 to 08:30 and 17:00 to 24:00 on weekdays, the monitoring system 1000 sets the operation mode as the monitoring mode, implements the sound recording, implements the image recording, and causes the shutter 300 to be in the open state. For example, in a case of monitoring an office, since it is estimated that a few employees may be present in the office during work-off hours, priority to the security can be given in that time zone.

Next, the example of operation of the control device 100 in a case where the shutter 300 is open and closed according to the time schedule in the time table T12 will be described. Here, two examples of operation are illustrated. A first example of operation illustrates an example of operation when the shutter 300 is open and closed under the consideration of the schedule. A second example of operation illustrates an example of operation when the shutter 300 is open and closed under the consideration of threat level as an example of an event.

Figure 10:
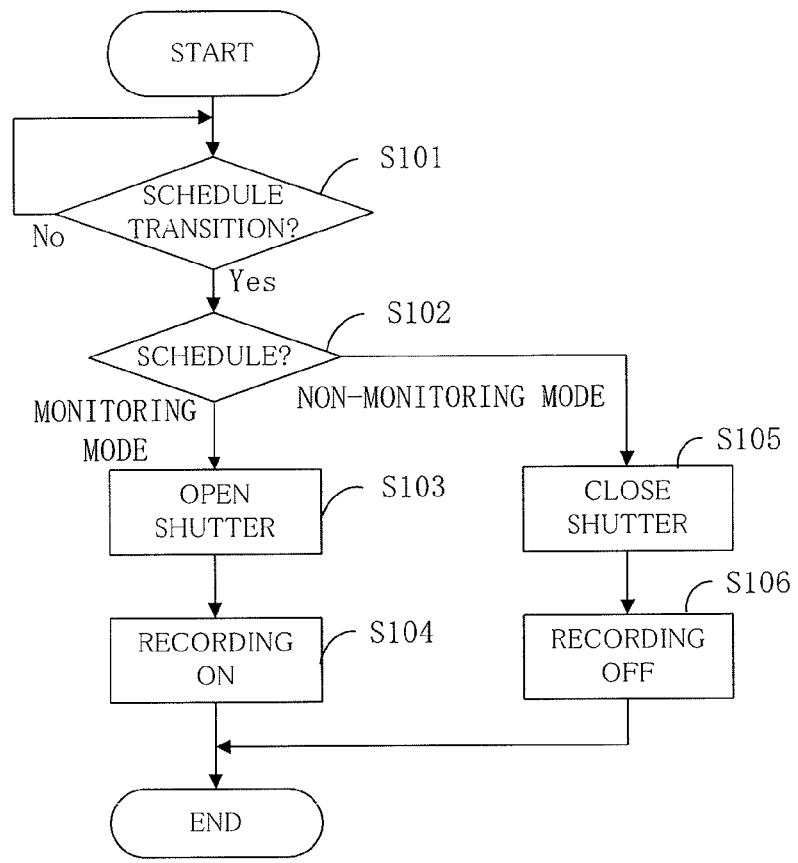
FIG. 10 is a flowchart illustrating a first example of operation of the control device in a case where the shutter is open and closed in the embodiment.

FIG. 10 is a flowchart illustrating an example of the first operation of the control device 100 in a case where the shutter 300 is open and closed.

First, the timer control unit 144 acquires information about the current time. The shutter control unit 141 determines whether or not the current time indicates a time of schedule transition with reference to the time table T12 (S101). In a case where the current time does not indicate the time of schedule transition, the step S101 is performed again.

In a case where the current time indicates the time of schedule transition, the shutter control unit 141 determines, with reference to the time table T12, whether the current time is in the time zone for monitoring mode or in the time zone for non-monitoring mode (S102). The time zone in S102 is the time zone after the schedule transition.

In a case where the current time is in the time zone for monitoring mode, the shutter control unit 141 transmits an instruction signal so as to open the shutter 300 via the communication unit 110 (S103). In addition, the image and sound control unit 142, transmits an instruction signal via the communication unit 110 so as to start collecting the sound by the microphone 240 of the camera device 200 and to start image capturing by the image capturing element 210 (S104).

In a case where the current time is in the time zone for non-monitoring mode, the shutter control unit 141 transmits an instruction signal with respect to the camera device 200 via the communication unit 110 so as to close the shutter 300 (S105). In addition, the image and sound control unit 142 transmits an instruction signal via the communication unit 110 so as to stop collecting the sound by the microphone 240 of the camera device 200 and to stop image capturing by the image capturing element 210 (S106).

According to the first example of operation of the control device 100, the monitoring system 1000 can operate according to the operation modes (monitoring mode and non-monitoring mode) which change depending on the schedule. In a case of the monitoring mode, the priority can be given to the securing of the security. In a case of the non-monitoring mode, the priority can be given to the protection of the privacy.

In FIG. 9 and FIG. 10, a case is illustrated where the image capturing and the sound collecting by the camera device 200 are implemented at the same time. Alternatively, the image capturing and the sound collecting may be implemented at different times. That is, in the monitoring mode, only the sound collecting may be implemented without capturing the image, or only the image capturing may be implemented without collecting the sound.

Next, the example of operation of the control device 100 in a case where the shutter 300 is open and closed depending on the threat level will be described.

Figure 11:
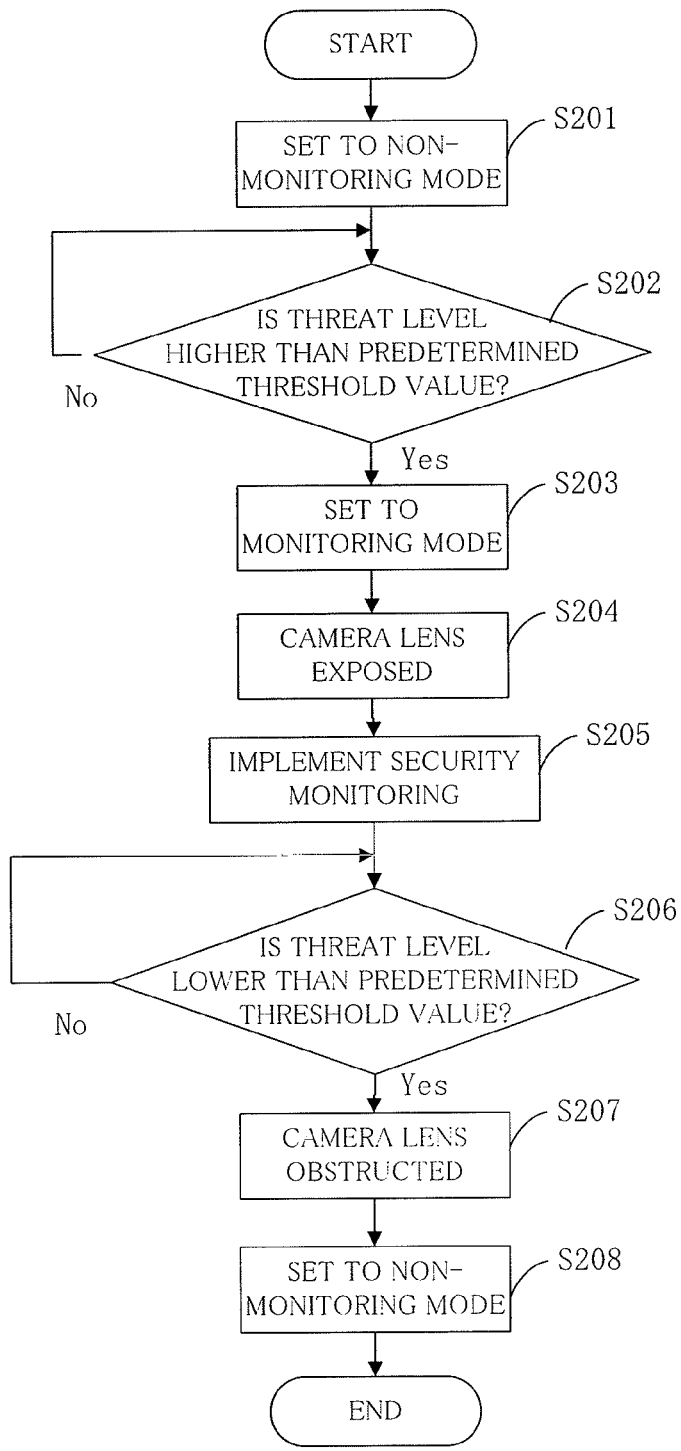
FIG. 11 is a flowchart illustrating a second example of the operation of the control device in a case where the shutter is open and closed in the embodiment.

FIG. 11 is a flowchart illustrating a second example of operation of the control device 100 in a case where the shutter 300 is open and closed. Moreover, in the second example of operation, a case where the threat level is high is an example of a case where an opening event occurs. In addition, a case where the threat level is low is an example of a case where the opening event does not occur or a closing event occurs.

In the second example of operation, the control unit 140 basically sets the operation mode of the monitoring system 1000 to the non-monitoring mode (S201). In the non-monitoring mode, the camera lens 260 is physically obstructed from the privacy-sensing area.

In a case where there is a threat at a high level, needs for safety and security take a higher priority than the need for the privacy. The threat at a high level includes, for example, a situation of a hostage or a fired shot. When the threat level exceeds a predetermined threshold value (S202), the control unit 140 transitions the operation mode to the monitoring mode (S203).

The case where the threat level exceeds a predetermined privacy threshold value, for example, includes a case where the emergency button 520 is pressed, a case where the effect that the emergency state is reported from the mobile terminal 530, and a case where a predetermined dangerous state is detected by the sensor 510.

In the monitoring mode, the shutter control unit 141 controls in such a manner that the shutter 300 is open, which enables the camera lens 260 be obstructed, and the shutter 300 moves to the position where the camera lens 260 is exposed (S204). In this way, the camera device 200 can monitor the privacy-sensing area and it is possible to secure the security with respect to the privacy-sensing area where the camera device 200 is disposed (S205).

After the step S205, after passing a predetermined time, for example, when a closing event occurs and the threat level is lower than the predetermined privacy threshold value (S206), the need for the privacy takes a higher priority than needs for the safety and the security. In this case, the shutter control unit 141 controls in such a manner that the shutter 300 is closed, and the shutter 300 returns to the position where the camera lens 260 is obstructed (S207). In addition, the control unit 140 transits the operation mode to the non-monitoring mode (S208).

The case where the threat level is lower than the predetermined threshold value, for example, includes a case where the pressing of the emergency button 520 is stopped, a case where an effect that the emergency state is terminated is notified from the mobile terminal 530, a case where the predetermined dangerous state is not detected by the sensor 510, and a case where a predetermined time has passed since the threat level exceeded the predetermined privacy level threshold value.

According to the second example of operation of the control device 100, in a case where the threat level is comparatively high, it is possible to strengthen the security. In addition, in a case where the threat level is comparatively low, for example, by using the state that the camera device 200 is obstructed from the outside, it is possible to realize the state in which a person in the privacy-sensing area does not feel the discomfort of being monitored.

Next, a PTZ operation timing of the camera device 200 and an opening and closing timing of the shutter 300 will be described. Here, the description will be made in cases where the shutter 300 is opened and the shutter 300 is closed.

FIGS. 12A to 12D are schematic diagrams illustrating specific examples of the PTZ operation timing of the camera device 200 and the opening timing of the shutter 300. The state transits in an order from FIG. 12A to FIG. 12D.

Here, it is assumed that the shutter 300 is opened and closed according to the opening and closing event as in the second example of operation described above. In addition, three doors 910A, 910B, and 910C of doors 910 are provided in the privacy-sensing area 900, and three door sensors 510F1, 510F2, and 510F3 of door sensors 510F are installed as sensors 510, for each door 910.

The door sensors 510F detect the opening and closing of the doors 910. The door sensor 510 includes, for example, a switch provided in the door key, a pressing switch, and an optical sensor that detects brightness and darkness or a magnetic sensor that includes a Hall element and a digital conversion IC.

In addition, preset position FP (FP1 to FP3) of each camera device 200 that corresponds to each door sensor 510F is set. For example, a preset position FP1 is set, in which the door 910A that corresponds to the door sensor 510F1 is included in the image capturing area. A preset position FP2 is set, in which the door 910B that corresponds to the door sensor 510F2 is included in the image capturing area. A preset position FP3 is set, in which the door 910C that corresponds to the door sensor 510F3 is included in the image capturing area.

Figure 12:
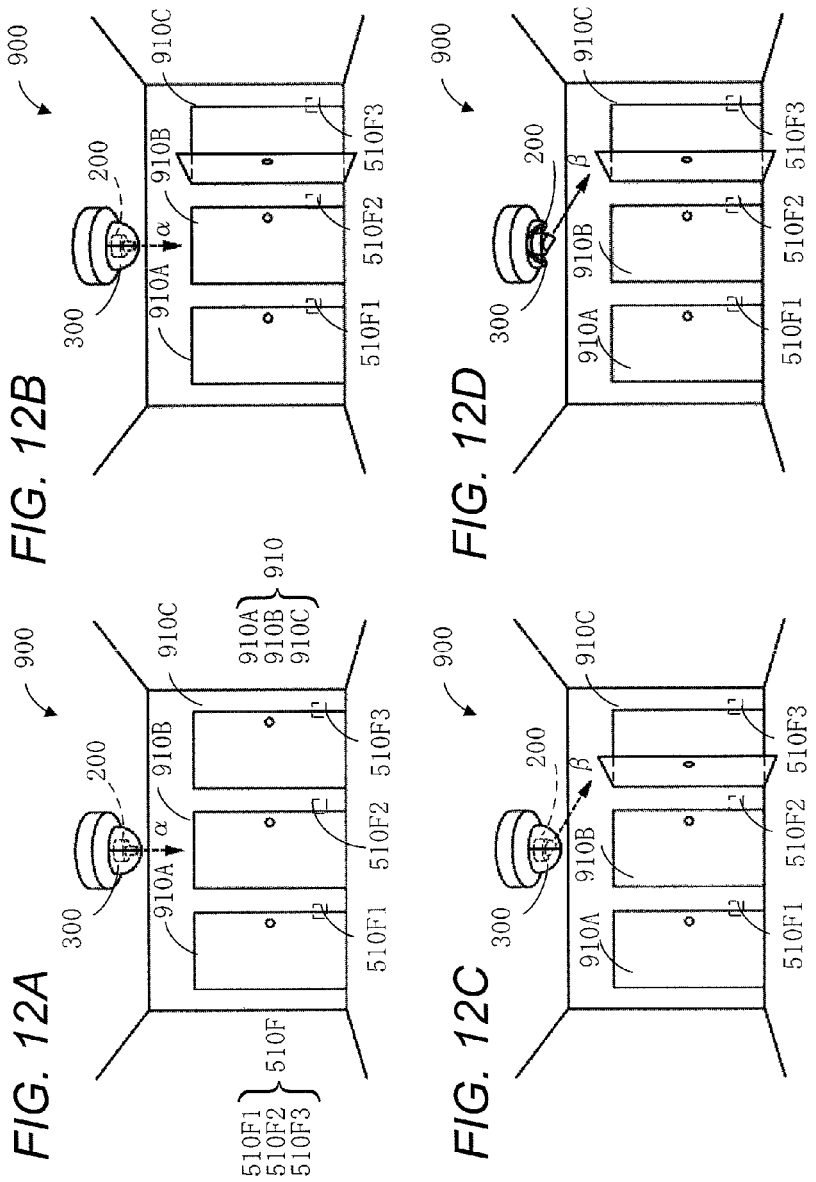
FIGS. 12A, 12B, 12C and 12D are schematic diagrams illustrating examples of PTZ operation timing of the camera device and opening timing of the shutter in the embodiment.

In FIG. 12A, it is presumed that three doors 910 are all in the closed state and the suspicious person as a subject to be monitored is not present. In this case, the door sensors 510F detect that the doors 910 are in a closed state, and the closing event is detected and the shutter 300 becomes to be in the closed state. In the case of the closing event, the PTZ operation is not particularly performed, and the image capturing area of the camera device 200 is in the initial state. The image capturing area is determined by the image capturing direction by the panning-tilting operation of the camera device 200 and the zooming in-out operation (for example, zooming in or zooming out) operation of the camera device 200. The image capturing area can be changed by changing at least one of the image capturing direction and the zooming in-out.

In the initial state of the image capturing area, in a case where the camera device 200 is installed on the ceiling, for example, the camera lens 260 is directed to the Z-direction (directly below direction, the arrow α direction in FIG. 12A), and is not in the state of zooming-in or zooming-out. This initial state, for example, is set as the preset position FP4 and stored in the storage unit 150 in advance.

In FIG. 12B, the door 910C is opened. When the door 910C is in the opened state, the door sensor 510F3 detects that the door 910C is in a closed state, and the event detection unit 120 of the control device 100 determines the opening event.

At the stage of FIG. 12B, the shutter 300 keeps the closed state. Therefore, the image capturing of outside the shutter 300 by the camera device 200 of which the image capturing area is in the initial state, is not started.

In FIG. 12C, the state in FIG. 12B is changed, and the camera device 200 performs the PTZ operation in such a manner that the preset position FP3 corresponding to the door sensor 510F3 is included in the image capturing area. Therefore, for example, by a change of posture of the camera device 200, the actual image capturing area (image capturing direction or the zooming in-out) is changed, and the camera lens 260 is directed to the direction of the door 910C. In FIG. 12C, the image capturing direction is the arrow β direction.

Moreover, in the stage of FIG. 12C, the shutter 300 keeps the closed state. Therefore, the image capturing for the outside of the shutter 300 by the camera device 200 of which the image capturing area is in the initial state, is not started.

In FIG. 12D, the shutter 300 is opened. That is, after the PTZ operation of the camera device 200, the shutter 300 is in the open state.

Accordingly, for example, the image capturing area of the camera device 200 of which the image capturing area is in transition from the pre-set position FP4 to the preset position FP3 does not include the vicinity of doors 910A and 910B, but includes the vicinity of the door 910C. Therefore, the image capturing by the camera device 200 in a wide area of capturing area can be prevented, and it is possible to achieve both of the privacy protection and the security securing. In addition, for example, in a case where a suspicious person enters from the door 910C, the image of the suspicious person can be captured; thus, it is possible to ensure the security.

Moreover, the case where the above-described opening event is detected may include, for example, the case where the authentication error is notified to the control device 100 from the visiting and leaving management system 2000 as the other system 540 and the case where the door 910 is detected to be opened by the door sensors 510F. In the authentication error, for example, the following cases are included: a case where a person who is not registered in the visiting and leaving management system 2000 executes the authentication process; and a case where the face of a person, for example, is different from that of the person registered in the visiting and leaving management system 2000 in advance.

In addition, the case where the opening event is detected may include, for example, the case where the authentication is not notified (there is no authentication) to the control device 100 from the visiting and leaving management system 2000 as the other system 540, and the case where the door 910 is detected to be opened by the door sensors 510F. In addition, the case where the opening event is detected may also include the case where there is no authentication as described above, the case where the doors 910 are detected to be destroyed, and the case where the card reader of the IC card installed near the doors 910 is discarded.

In addition, in a case where a person is entering the privacy-sensing area 900 using a regular IC card, since the control device 100 is notified of the fact that the visitor is admitted to visit and leave, from the visiting and leaving management system 2000, the person who is admitted to visit and leave is estimated to be an unsuspicious person (for example, an employee in the office). In this case, even though the control device 100 detects the opening and closing of the doors 910 by the door sensor 910F, the event detection unit 120 does not determine the opening event detected by the door sensor 910F. According the privacy of the unsuspicious person can be protected.

In a case where the authentication process is normally completed, since the visitor can be determined to be the unsuspicious person (for example, the employee in the office), the opening and closing of the doors 910 may be admitted by the visiting and leaving management system 2000. In addition, in a case where the authentication process is not normally completed, for example, in a case where the authentication error occurs or there is no authentication, since the visitor is possibly a suspicious person, the opening and closing of the doors 910 may be prohibited by the visiting and leaving management system 2000.

Figure 13:
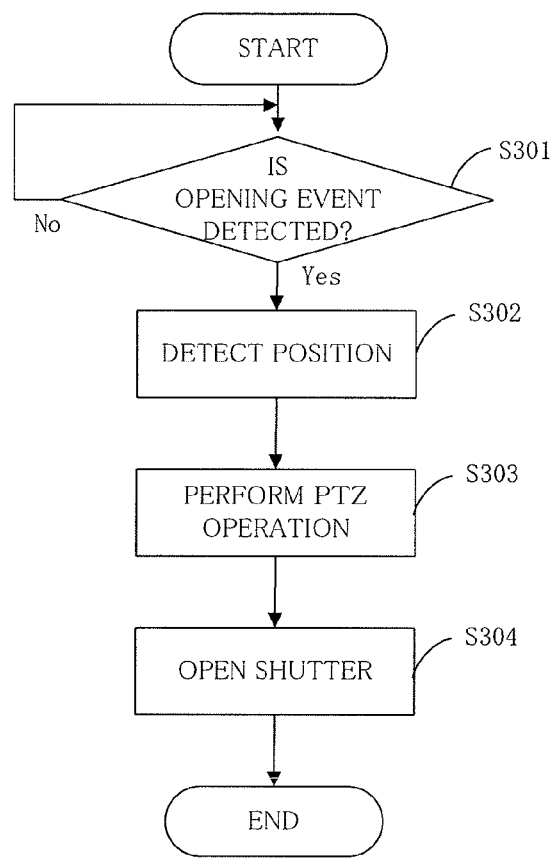
FIG. 13 is a flowchart illustrating an example of control of the control device in a case of PTZ operation of the camera device and opening operation of the shutter in the embodiment.

FIG. 13 is a flow chart illustrating an example of control by the control device 100 in performing the PTZ operation of the camera device 200 and the opening operation of the shutter 300.

First, the event detection unit 120 detects the absence or presence of the opening event (S301). In a case where the opening event is not detected, the process of S301 is performed again.

The case where the opening event is detected includes the cases of: for example, the case where the door is opened as in FIG. 12B, the case where the window is opened, the case where the predetermined person is detected, and the case where the emergency button 520 is pressed.

In a case where the opening event is detected, the position detection unit 130 detects the position of the devices (for example, the sensor 510, the emergency button 520, or the mobile terminal 530) that transmit the information from which the opening event is detected (S302). This position information may be, for example, stored in the storage unit 150 in advance or may be notified by the communication unit 110 from each of the devices described above.

Next, the PTZ control unit 143 controls with respect to the camera device 200 such that the PTZ operation is performed based on the detected position information (S303). In this case, for example, the PTZ control unit 143 transmits a PTZ instruction signal (a control signal) which instructs the PTZ operation to the camera device 200. For example, as information of the preset position of the camera device 200, the PTZ control unit 143 keeps the information of the sensing area 511 of each sensor 510 in advance. The PTZ control unit 143 instructs the camera device 200 to perform the PTZ operation so as to capture the image of the preset position corresponding to the sensing area 511 of the sensor 510 by which the opening event is detected. For example, the sensing area of the door sensors 510F includes the vicinity of the doors 910 that corresponds to the door sensors 510F.

In the camera device 200, for example, the communication unit 230 receives the PTZ instruction signal from the control device 100, and the PTZ control unit 227 performs the PTZ operation based on the PTZ instruction signal. The PTZ instruction signal includes a signal that instructs at least one operation of panning, tilting, and zooming of the camera device 200, and for example, a signal that instructs the image capturing direction or zooming (for example zoom-in or zoom-out) of the camera device 200. Even in a case where the image capturing direction is not changed, since the image capturing area can be changed to a necessary area by zooming, it is possible to achieve both of the privacy protection and the security securing.

Next, the shutter control unit 141 controls the shutter 300 so as to be opened. In this case, for example, the shutter control unit 141 transmits an instruction signal (a control signal) so as to open the shutter 300, with respect to the camera device 200 (S304). In this way, the shutter 300 is in the open state.

In S304, for example, the shutter control unit 141 instructs the shutter 300 to be opened based on a predetermined signal from the camera device 200. For example, the communication unit 110 transmits the PTZ instruction signal to the camera device 200, and the camera device 200 replies to the PTZ instruction signal with a response signal (ACK signal), and the communication unit 110 may receive the ACK signal. In a case where the ACK signal is received from the camera device 200, the shutter control unit 141 may instruct the shutter 300 to be opened. In this way, the early opening of the shutter 300 can be suppressed.

Alternatively, in S304, for example, the shutter control unit 141 may instruct the shutter 300 to be opened after elapse of a predetermined time since the PTZ instruction signal is transmitted to the camera device 200. The predetermined time may include the time required for the PTZ operation or time required for the opening and closing of the shutter 300. In this way, the early opening of the shutter 300 can be suppressed.

In a case where the camera device 200 includes the shutter 300 or in a case where the camera device 200 can control the shutter 300, the camera device 200 instructs the shutter 300 to be opened after performing the PTZ operation. In this way, by merely transmitting the instruction from the control device 100 to the camera device 200 without considering the timing of the camera device 200 and the shutter 300, the camera device 200 and the shutter 300 can be operated. Thus, the early opening of the shutter 300 can be suppressed.

According to the example of control in FIG. 13, the image capturing in the image capturing area of the camera device 200 at the time before or during the PTZ operation in S303 can be prevented. That is, the image in the image capturing area only after the PTZ operation in S303 can be captured. In addition, since the shutter 300 is in a closed state before the PTZ operation, for example, it is possible to reduce the possibility of giving discomfort to a person being present in the image capturing area before or during the PTZ operation. In this way, it is possible to strengthen the privacy protection. In addition, for example, in a case where a suspicious person enters from the door 910C, the image of the suspicious person can be captured and it is possible to ensure the security.

In the above cases, a timing to actually start capturing the image by the camera device 200 is arbitrary. Namely, the camera device 200 may start capturing the image, which is hidden by the shutter 300, before the PTZ control unit 143 transmits the PTZ instruction signal which instructs the PTZ operation to the camera device 200, or such a control signal to start the image capturing may be included in the PTZ instruction signal. Alternatively, the control signal to start the image capturing may be transmitted separately in addition to the PTZ instruction signal, or transmitted after the instruction signal which opens the shutter 300 is transmitted to the shutter 300.

FIGS. 14A to 14D are schematic diagrams illustrating specific examples of the PTZ operation of the camera device 200 and the closing timing of the shutter 300. The state transits in an order of FIG. 14A to FIG. 14D.

Here, it is assumed that the shutter 300 is switched to be opened and closed according to the opening and closing event as in the second example of operation described above. In addition, three doors 910A, 910B, and 910C are provided in the privacy-sensing area 900, and door sensors 510F1, 510F2, and 510F3 are installed as sensor 510, for each door 910.

In addition, a preset, position FP (FP1 to FP3) of each camera device 200 that corresponds to each door sensor 510F is set. For example, a preset position FP1 is set, in which the door 910A that corresponds to the door sensor 510F1 is included in the image capturing area. A preset position FP2 is set, in which the door 910B that corresponds to the door sensor 510F2 is included in the image capturing area. A preset position FP3 is set, in which the door 910C that corresponds to the door sensor 510F3 is included in the image capturing area.

In FIG. 14A, the door 910C is in the open state, and the camera device 200 is set on the preset position FP3. That is, the sensing area of the door sensor 510 which corresponds to the door 910C is included in the image capturing area of the camera device 200. In addition, the shutter 300 is in the open state. Therefore, the state enables the image around the door 910C to be captured.

In FIG. 14B, the door 910C is closed, thus, all of three doors 910 are shifted to the closed state. In this case, the door sensors 510F detect that the doors 910 are in the closed state, and then the closing event is detected.

In FIG. 14C, in response to the detection of the closing event, the shutter 300 is closed. Therefore, the image in an area other than around the door 910C is not captured. Moreover, in the stage of FIG. 14C, the camera device 200 does not perform the PTZ operation and keeps the direction toward the preset position FP3 (the arrow β direction in FIG. 14C).

In FIG. 14D, in response to the detection of the closing event, the camera device 200 performs the PTZ operation in such a manner that the image capturing area of the camera device 200 returns to the initial state. For example, the camera device 200 performs the PTZ operation so as to capture the image toward the direction of the preset position FP4 (the arrow α direction in FIG. 14D).

Therefore, since the shutter 300 is in the closed state at the time of the PTZ operation, for example, during the time when the image capturing area of the camera device 200 is shifted to the preset position FP4 from the preset position FP3, the image capturing by the camera device 200 in a wider area can be suppressed.

Figure 15:
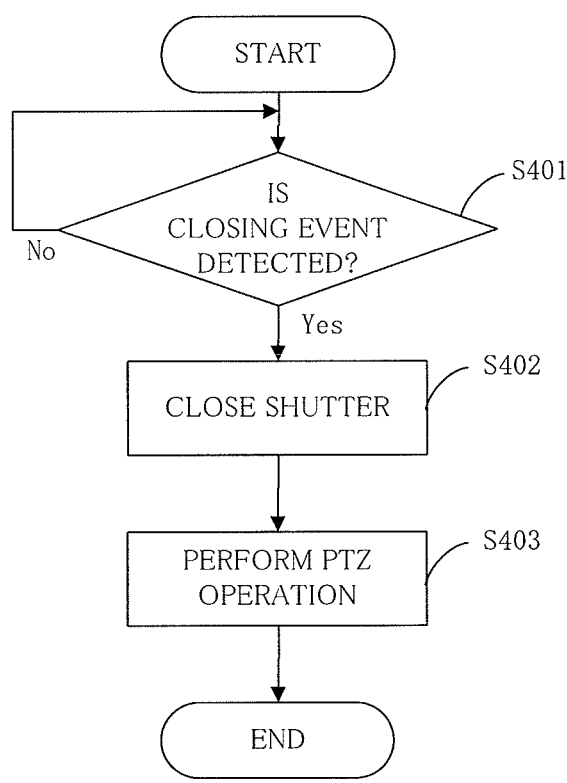
FIG. 15 is a flowchart illustrating an example of control of the control device in a case of PTZ operation of the camera device and closing operation of the shutter in the embodiment.

FIG. 15 is a flow chart illustrating an example of control by the control device 100 in performing the PTZ operation of the camera device 200 and the closing operation of the shutter 300.

First, the event detection unit 120 detects the absence or presence of the closing event (S401). In a case where the closing event is not detected, the process of S301 is performed again. The case where the closing event is detected includes the cases of: for example, the case where the door is closed as in FIG. 14B, the case where the window is closed, the case where the predetermined person is not detected, and the case where the emergency button 520 is not pressed.

In a case where the opening event is detected, the shutter control unit 141 controls the shutter 300 so as to be closed. In this case, for example, the shutter control unit 141 transmits an instruction signal (a control signal) with respect to the camera device 200 so as to close the shutter 300 (S402). In this way, the shutter 300 is in the closed state.

Next, the PTZ control unit 143, for example, controls the camera device 200 so as to perform the PTZ operation in such a manner that the image capturing area of the camera device 200 returns to the initial state (S403). In this case, for example, the PTZ control unit 143 transmits a PTZ instruction signal (a control signal) to the camera device 200. For example, the PTZ control unit 143 keeps the initial state as one of the preset positions in advance, and instructs the camera device 200 to perform the PTZ operation so as to capture the image of the preset position. Moreover, returning to the initial state includes, for example, returning to the state of immediately before performing of the PTZ operation due to the opening event and returning to the predetermined position.

In the camera device 200, for example, the communication unit 230 receives the PTZ instruction signal from the control device 100, and the PTZ control unit 227 performs the PTZ operation based on the PTZ instruction signal.

According to the example of control in FIG. 15, when the opening event is completed, the image capturing in the image capturing area of the camera device 200 during and after the PTZ operation can be prevented. That is, the image in the image capturing area only before the closing of the shutter 300 in S402 can be captured. In addition, since the shutter 300 is in a closed state before the PTZ operation, for example, it is possible to reduce the possibility of giving discomfort to a person being present in the image capturing area during or after the PTZ operation. In this way, it is possible to strengthen the privacy protection.

In addition, according to the example of control in FIG. 13 or FIG. 15, since the shutter 300 is opened in the state in which a specific area is included in the image capturing area, a sequential change of the brightness of the captured image due to the change of the image capturing area according to the PTZ operation can be suppressed. Therefore, the exposure can easily be adjusted. Particularly, in a case where the change of the brightness is large before or after the change of the image capturing area, the amount of the exposure adjustment can be greatly reduced.

Moreover, in a case where a plurality of opening events is detected, the control device 100 may control the camera device 200 so as to perform the PTZ operation on the basis of the priority. For example, in FIG. 12A to 12D, in a case where there is a high possibility that suspicious persons enter the doors 910A, 910B, and 910C in an order, priority information in which the higher priority is set in an order of 510F1, 510F2, and 510F3 may be kept in the storage unit 150 in advance.

In this case, for example, when the doors 910A and 910C are opened at substantially the same time, the open states of the doors 910A and 910C is detected by the door sensors 510F1 and 510F3 at substantially the same time. Accordingly, the control device 100 may instruct the camera device 200 to perform the PTZ operation so as to capture the image of the preset position FP1. In a case where the camera device 200 is set to the preset position FP1, the sensing area of the door sensor 510F1 which has a higher priority is included in the image capturing area of the camera device 200.

In addition, in a case where a plurality of opening events is detected, the control device 100 may control the camera device 200 such that the PTZ operation is performed based on the detection time of the opening events. That is, the control device 100 may control the camera device 200 such that the PTZ operation is performed with priority being given to the opening event that occurred later.

In this case, for example, when the door 910C is opened immediately after the door 910A is opened, the open states of the doors 910A and 910C are sequentially detected by the door sensors 510F1 and 510F3. Accordingly, the control device 100 may instruct the camera device 200 to perform the PTZ operation so as to capture the image of the preset position FP3 which corresponds to the later door 910C. In a case where the camera device 200 is set to the preset position FP3, the sensing area of the door sensor 510F3 which detects the open state of the door 910C later is included in the image capturing area of the camera device 200.

In addition, in a case where the opening event is detected, the control device 100 may control the camera device 200 such that the PTZ operation is performed with priority being given to the first detected opening event, and making the subsequently detected opening events invalid.

In this case, for example, when the door 910C is opened immediately after the door 910A is opened, the open states of the doors 910A and 910C are sequentially detected by the door sensors 510F1 and 510F3. Accordingly, the control device 100 may instruct the camera device 200 to perform the PTZ operation so as to capture the image of the preset position FP1 which corresponds to the earlier door 910C. In a case where the camera device 200 is set to the preset position FP1, the sensing area of the door sensor 510F1 which firstly detects the open state of the door 910A is included in the image capturing area of the camera device 200.

In addition, in a case where a plurality of camera devices 200 exists and the plurality of opening events is detected, at least one camera device 200 may be assigned with respect to each opening event, and each camera device 200 may capture the image of the image capturing area which corresponds to each opening event.

In this way, according to the monitoring system 1000, the shutter 300 is opened after the PTZ operation of the camera device 200 in response to the sensors 510. In addition, the camera device 200 performs the PTZ operation after the closing of the shutter 300 in response to the sensors 510. As a result, image capturing of the area other than the specific area corresponding to the sensors 510 by the camera device 200 can be suppressed. Therefore, it is possible to strengthen the privacy protection. In addition, in the specific area corresponding to the sensors 510, it is possible to ensure the security.

In addition, in a camera in the related art, the relationship between the timing of the panning, tilting, and zooming of the camera device, and the timing of the opening and closing of the shutter has not been considered. Therefore, there is a possibility that images of many persons who are not subjected to be monitored may be captured. In this case, the privacy protection with respect to the persons who are not subjects to be monitored (for example, the suspicious person) is insufficient. In contrast, according to the monitoring system 1000 in the embodiment, since the image of only the image capturing area corresponding to the monitoring subject is captured, it is possible to improve the privacy protection level for the person who is not a subject to be monitored.

Furthermore, the present invention is not limited to the configuration in the embodiment described above, and any configuration may be applicable as long as the functions of the configuration in the embodiment can be achieved.

For example, in the embodiment described above, in a case where the mobile terminal 530 is portable and position information thereof cannot be acquired, or in a case where position information of the event occurrence position notified by other system 540 cannot be acquired, the camera device 200 may omit the PTZ operation. That is, in a case where the position information of the device that notifies the control device 100 of the information from which the event is detected is not clear, the position of the image capturing target cannot be specified. Thus, the shutter 300 may perform the opening and closing operation without performing the PTZ operation by the camera device 200.

In addition, in a case where the sensor 510 is a fire alarm system, for example, since there is a case where the smoke is flowing in from a position different from the fire source, after the PTZ operation by the camera device 200, the shutter 300 may not be opened. In this way, the case where the sensor 510 is a fire alarm system can be an example of the case where the position information is not clear.

Alternatively, as described above, in a case where the position information cannot be acquired, the PTZ operation by the camera device 200 may be controlled based on information that indicates the default position determined in advance. In this way, regardless of whether any terminal or system detects the information or not, the camera device 200 can be directed toward the predetermined position to be monitored.

In addition, in the embodiment described above, collecting and recording of the sound by the microphone in the camera device 200 may be omitted.

In addition, in the embodiment described above, it is assumed that the closing event or the closing schedule of the shutter 300 (non-monitoring mode) exists, and the duration of the opening event or the duration of opening the shutter 300 may be set in advance. In this case, the shutter 300 may be in the closed state after the predetermined duration from the starting of the opening event or starting of the monitoring mode by the schedule.

In addition, in the embodiment described above, a case is illustrated where the various instruction signals are transmitted from the control device 100 with respect to the camera device 200, and the camera device 200 operates based on such instruction signals. Even in a case other than those cases, the camera device 200 may detect various events, and may operate independently.

In addition, in the embodiment described above, in a case where the image capturing area is changed, it is mainly illustrated that the image capturing area is changed to any of the preset positions determined in advance. However, the image capturing area may be changed according to position information of the position where the sensors 510 (for example, door sensor 510F) that detect the predetermined events exist. This position information includes, for example, the position information acquired by the GPS and other position information.

In addition, in the embodiment described above, in a case where the opening event is determined, the shutter 300 is opened after the PTZ operation of the camera device 200. On the other hand, in a case where the closing event is determined, the PTZ operation of the camera device 200 is performed after the closing of the shutter 300. Therefore, it can also be said that the order of a first control that controls the image capturing area of the camera device 200 and a second control that controls the shutter 300 is derived, according to whether the event detected in accordance with the information from the sensor 510 is the opening event or the closing event.

In this way, according to the type of the event, it is possible to determine the timing of changing the image capturing area and the timing of opening and closing of the shutter. Therefore, it is possible to achieve both of the privacy protection and the security securing.

In addition, in the embodiment described above, a use of a PTZ camera as the camera device 200 is illustrated. However, an omni-directional camera may be used. In this case, for example, the control unit 140 of the control device 100 may include an image processing unit. After acquiring an omni-directional image from the camera device 200, the image processing unit may extract an image of the predetermined area from the omni-directional image. The predetermined area here is determined, for example, according to the sensor 510 that detects the predetermined event. The predetermined area may be the same as the image area captured by the PTZ camera after the PTZ operation. By the control device 100 controlling the shutter 300 so as to be opened after extracting the image of the predetermined area by the image processing unit, the image output area can be limited to the desired area until the shutter 300 is opened. Therefore, it is possible to protect the privacy.

In addition, for example, the control unit 140 of the control device 100 may include an external output interface. For example, the external output interface includes an interface for transmitting a signal (image) to an external display or an external storage device. In a case where the omni-directional camera is used, by the control device 100 controlling the shutter 300 so as to be opened after outputting of the extracted image of the predetermined area via the external output interface, the image output area can be limited to the desired area until the shutter 300 is opened. Therefore, it is possible to protect the privacy.

In the above-described embodiment, the control device 100 instructs the PTZ operation by transmitting the PTZ instruction signal (control signal) with respect to the camera device 200. At this time, selecting or changing of the actual image capturing area of the camera device 200 may be performed by the control device 100 or may be performed by the camera device 200. In a case where the control device 100 selects the actual image capturing area of the camera device 200, the PTZ instruction signal is transmitted with the selected actual image capturing area being included in the PTZ instruction signal. On the other hand, in a case where the camera device 200 selects the actual image capturing area of the camera device 200, the PTZ instruction signal is transmitted with the information detected by the sensor or related information included in the PTZ instruction signal.

(Summary of Aspects of the Present Invention)

An aspect of the present invention provides a monitoring apparatus for controlling an image capturing device and a shutter which limits a capturing area of the image capturing device, the monitoring apparatus including: a capturing area controller, configured to transmit a first control signal to cause the image capturing device to capture an image in an actual capturing area of the image capturing device; and a shutter controller, configured to transmit a second control signal to open the shutter after the first control signal is transmitted, wherein the actual capturing area of the image capturing device is selected from a capturable area of the image capturing device in accordance with first information which is sensed by a sensor device.

The monitoring apparatus may be configured so that the capturing area controller selects the actual capturing area of the image capturing device in accordance with the first information, and transmits the first control signal to cause the image capturing device to capture the image in the actual capturing area selected by the capturing area controller.

The monitoring apparatus may be configured so that the capturing area controller transmits the first control signal to cause the image capturing device to select the actual capturing area of the image capturing device in accordance with the first information and to capture the image in the actual capturing area selected by the image capturing device.

According to the configuration as mentioned above, the image capturing by the image capturing device is controlled or limited until the shutter opens. Accordingly, the image capturing by the image capturing device can be suppressed before the control (or selection) of the capturing area or during the control (or selection) of the capturing area; thus the level of the privacy protection is improved.

The monitoring apparatus may be configured so that the first information contains position information indicative of a position of the sensor device, and the actual capturing area is selected based on the position information.

The monitoring apparatus may be configured so that the actual capturing area is selected to contain a sensing area by the sensor device in the actual capturing area.

According to the configuration as mentioned above, a sensing area sensed by the sensor device around which the threat possibly occurs can be contained in the actual capturing area, and the threat around the sensing area can be monitored. Thus, the level of the security is improved.

The monitoring apparatus may be configured so that the capturing area controller gives an instruction to the image capturing device to control a capturing direction or a zooming operation of the image capturing device.

According to the configuration as mentioned above, the shutter opens after the pan control, tilt control or zoom control (zoom-in or zoom-out control). Thus, a privacy protection for a person located in a capturing area before or while the image capturing direction or zooming factor is changed is enhanced.

The monitoring apparatus may be configured so that, even in a case where the sensor device or another sensor device detects second information, the actual capturing area is selected based on the first information without using the second information.

According to the configuration as mentioned above, the actual capturing area is selected based on a part of the information as sensed without using another part of the information. For example, it is possible to capture the image preferentially in a capturing area corresponding to a sensor device, the priority of which is set to be higher than other devices because the sensor device senses an area in which the possibility that the threat occurs is predicted to be high. As another example, if a priority is given to a time at which the possibility that the threat occurs is predicted to be high, it is possible to capture the image preferentially in the capturing area covered by a sensor device which senses the threat at the given time. As still another example, it is possible to capture the image preferentially in a capturing area covered by a sensor device which senses the threat first.

The monitoring apparatus may be configured so that the first signal for causing the image capturing device to determine the actual capturing area and to receive a second signal, wherein the shutter controller transmits the second control signal to open the shutter in response to receiving a first response signal responsive to the first signal from the image capturing device.

According to the configuration as mentioned above, since the camera device and the monitoring apparatus operate in cooperation with each other, the possibility that the shutter opens before or while the control or selection of the capturing area can be further reduced. Thus, the privacy protection is improved.

The monitoring apparatus may be configured so that the shutter controller transmits the second control signal to open the shutter when a given time period is elapsed after the first control signal is transmitted.

According to the configuration as mentioned above, since the timing for opening the shutter is determined in consideration with a control time or selection time of the capturing area or opening/closing control time of the shutter, the possibility that the shutter opens before or while the control or selection of the capturing area can be further reduced. Thus, the privacy protection is improved.

The monitoring apparatus may be configured so that in a case where the first information contains first position information indicative of a position of the sensor device, the actual capturing area is selected based on the first position information, whereas in a case where the first information does not contain the first position information, the actual capturing area is selected based on second position information indicative of a default position.

According to the configuration as mentioned above, the shutter is controlled to be opened even if the position of the sensor device is identified or not identified. Thus, the security is ensured.

The monitoring apparatus may be configured so that a preset capturing area corresponding to the sensor device is selected as the actual capturing area.

According to the configuration as mentioned above, since the preset capturing area as previously determined for the sensor device can be contained in the actual capturing area, for example, the threat in the area corresponding to the sensor device is monitored. Thus, the level of the security is improved.

The monitoring apparatus may be configured so that the shutter controller transmits a third control signal to close the shutter in response to receiving third information which is sensed by the sensor device or another sensor device, and the capturing area controller transmits a fourth control signal to cause the image capturing device to move the actual capturing area after the third control signal is transmitted.

According to the configuration as mentioned above, the image capturing by the image capturing device is controlled after the shutter closes. Accordingly, the image capturing by the image capturing device can be suppressed after the control (or selection) of the capturing area or during the control (or selection) of the capturing area; thus the level of the privacy protection is improved.

The monitoring apparatus may be configured so that the capturing area controller causes the image capturing device to change the actual capturing area to a predetermined capturing area.

According to the configuration as mentioned above, for example, when the target to be monitored moves outside a predetermined area, monitoring of the predetermined area can be released. In addition, for example, even if the capturing area is changed from the predetermined area, the privacy for the person located in a capturing area while or after the change of the capturing area.

Another aspect of the present invention provides a monitoring system, including: an image capturing device for capturing an image; a shutter which limits a capturing area of the image capturing device; a monitoring apparatus for controlling the image capturing device and the shutter; and a sensor device, wherein the sensor device senses and transmits first information, the monitoring apparatus includes: a receiver, configured to receive the first information; and a transmitter, configured to transmit a first control signal and a second control signal, wherein the first control signal causes the image capturing device to capture an image in an actual capturing area of the image capturing device, and the second control signal opens the shutter, the image capturing device receives the first control signal and captures the image in the actual capturing area, the shutter receives the second control signal, and opens in accordance with the second control signal after the image capturing device captures the image in the actual capturing area, and the actual capturing area of the image capturing device is selected from a capturable area of the image capturing device in accordance with the first information which is sensed by the sensor device.

According to the configuration as mentioned above, the image capturing by the image capturing device is controlled or limited until the shutter opens. Accordingly, the image capturing by the image capturing device can be suppressed before the control (or selection) of the capturing area or during the control (or selection) of the capturing area; thus the level of the privacy protection is improved.

The monitoring system may be configured so that the first control signal contains an instruction for the image capturing device to control a capturing direction or a zooming operation of the image capturing device.

According to the configuration as mentioned above, the shutter opens after the pan control, tilt control or zoom control (zoom-in or zoom-out control). Thus, a privacy protection for a person located in a capturing area before or while the image capturing direction or zooming is changed is enhanced.

The monitoring system may be configured so that the first information contains position information indicative of a position of the sensor device, and the actual capturing area is selected based on the position information.

According to the configuration as mentioned above, a sensing area sensed by the sensor device around which the threat possibly occurs can be contained in the actual capturing area, and the threat around the sensing area can be monitored. Thus, the level of the security is improved.

The monitoring system may be configured so that a preset capturing area corresponding to the sensor device is selected as the actual capturing area.

According to the configuration as mentioned above, since the preset capturing area as previously determined for the sensor device can be contained in the actual capturing area, for example, the threat in the area corresponding to the sensor device is monitored. Thus, the level of the security is improved.

The monitoring system may be configured so that the sensor device senses and transmits second information, the receiver of the monitoring apparatus receives the second information, the transmitter of the monitoring apparatus transmits third control signal to close the shutter and fourth control signal to move the actual capturing area in accordance with the first information, and the image capturing device moves the actual capturing area after the shutter closes.

According to the configuration as mentioned above, the image capturing by the image capturing device is controlled after the shutter closes. Accordingly, the image capturing by the image capturing device can be suppressed after the control (or selection) of the capturing area or during the control (or selection) of the capturing area; thus the level of the privacy protection is improved.

Still another aspect of the present invention provides a monitoring system, including: an image capturing device for capturing an omni-directional image; a shutter which limits a capturing area of the image capturing device; a monitoring apparatus for controlling the image capturing device and the shutter; and a sensor device, wherein the sensor device senses and transmits first information, the monitoring apparatus includes: a receiver, configured to receive the first information and the omni-directional image; an image processor, configured to extract an image in a given area from the omni-directional image; and a transmitter, configured to transmit a control signal for controlling the shutter, the shutter receives the control signal, and opens in accordance with the control signal, and the shutter opens after the image processor of the monitoring apparatus extracts the image in the given area.

The monitoring system may be configured so that it further includes an external output interface, wherein the shutter opens after the image in the given area extracted by the image processor is output from the external output interface.

According to the configuration as mentioned above, since an image in a selected area is extracted from an omni-directional image before the shutter opens, the image capturing by the image capturing device can be limited until the shutter closes. Thus, it is avoided that an object other than the desired target to be monitored is visually output, for example, in a monitor. Thus, the level of the privacy protection is improved.

A further aspect of the present invention provides a method for controlling an image capturing device and a shutter in a monitoring system, the method including: sensing first information by a sensor device; selecting an actual capturing area of the image capturing device in accordance with the first information; causing the image capturing device to direct the image capturing device to the selected actual capturing area and capture an image in the selected actual capturing area of the image capturing device; and opening the shutter after the image capturing device is directed to the selected actual capturing area.

According to the method as mentioned above, the image capturing by the image capturing device is controlled or limited until the shutter opens. Accordingly, the image capturing by the image capturing device can be suppressed before the control (or selection) of the capturing area or during the control (or selection) of the capturing area; thus the level of the privacy protection is improved.

The method may be configured by further including sensing third information by the sensor device or another sensor device; controlling the shutter to be closed in accordance with the third information; and causing the image capturing device to move the actual capturing area after the shutter is controlled to be closed.

According to the method as mentioned above, the image capturing by the image capturing device is controlled after the shutter closes. Accordingly, the image capturing by the image capturing device can be suppressed after the control (or selection) of the capturing area or during the control (or selection) of the capturing area; thus the level of the privacy protection is improved.

The present invention may be useful for an apparatus or the like to improve the level of privacy protection and/or the security.

What is claimed is:

1. A monitoring apparatus for controlling an image capturing device and a shutter which limits a capturing area of the image capturing device, the monitoring apparatus comprising:
a capturing area controller, configured to transmit a first control signal over a first communication link to a designated camera to cause the image capturing device to align the designated camera and to prepare to capture an image in an actual capturing area of the image capturing device;
a shutter controller, configured to transmit a second control signal over the first communication link to open the shutter after the first control signal is transmitted and after the designated camera has been substantially aligned, in response to the first control signal, enabling the capturing of the image in the actual capturing area, and
a communicator that receives first information sensed by a sensor over a second communication link,
wherein the actual capturing area of the image capturing device is selected by the capturing area controller from a capturable area of the image capturing device in accordance with the first information, which is sensed by the sensor and transmitted over the second communication link from the sensor to the capturing area controller through the communicator.

2. The monitoring apparatus according to claim 1, wherein the capturing area controller selects the actual capturing area of the image capturing device in accordance with the first information, and transmits the first control signal to cause the image capturing device to capture the image in the actual capturing area selected by the capturing area controller.

3. The monitoring apparatus according to claim 1, wherein the first information contains position information indicative of a position of the sensor, and
the actual capturing area is selected based on the position information.

4. The monitoring apparatus according to claim 1, wherein the actual capturing area is selected to contain a sensing area by the sensor in the actual capturing area.

5. The monitoring apparatus according to claim 1, wherein the capturing area controller gives an instruction to the image capturing device to control a capturing direction or a zooming operation of the image capturing device.

6. The monitoring apparatus according to claim 1, wherein even in a case where the sensor or another sensor detects second information, the actual capturing area is selected based on the first information without using the second information.

7. The monitoring apparatus according to claim 1, wherein the shutter controller transmits the second control signal to open the shutter in response to receiving a first response signal responsive to the first signal from the image capturing device.

8. The monitoring apparatus according to claim 1, wherein the shutter controller transmits the second control signal to open the shutter when a given time period is elapsed after the first control signal is transmitted.

9. The monitoring apparatus according to claim 1, wherein in a case where the first information contains first position information indicative of a position of the sensor, the actual capturing area is selected based on the first position information,
whereas in a case where the first information does not contain the first position information, the actual capturing area is selected based on second position information indicative of a default position.

10. The monitoring apparatus according to claim 1, wherein a preset capturing area corresponding to the sensor is selected as the actual capturing area.

11. The monitoring apparatus according to claim 1, wherein the shutter controller transmits a third control signal to close the shutter in response to receiving third information which is sensed by the sensor or another sensor, and
the capturing area controller transmits a fourth control signal to cause the image capturing device to move the actual capturing area after the third control signal is transmitted.

12. The monitoring apparatus according to claim 11, wherein the capturing area controller causes the image capturing device to change the actual capturing area to a predetermined capturing area.

13. A monitoring system, comprising:
an image capturing device for capturing an image;
a shutter which limits a capturing area of the image capturing device;
a monitoring apparatus for controlling the image capturing device and the shutter; and
a sensor,
wherein the sensor senses and transmits first information over a second communication link to the monitoring apparatus,
the monitoring apparatus includes:
a receiver, configured to receive the first information; and
a transmitter, configured to transmit a first control signal and a second control signal over a first communication link to the image capturing device, wherein the first control signal causes the image capturing device to align and to prepare to capture an image in an actual capturing area of the image capturing device, and the second control signal opens the shutter after the designated camera has been substantially aligned, the image capturing device receives the first control signal and captures the image in the actual capturing area, the shutter receives the second control signal, and opens in accordance with the second control signal after the image capturing device has been substantially aligned enabling the capturing of the image in the actual capturing area, and the actual capturing area of the image capturing device is selected by the monitoring apparatus from a capturable area of the image capturing device in accordance with the first information which is sensed by the sensor.

14. The monitoring system according to claim 13, wherein the first control signal contains an instruction for the image capturing device to control a capturing direction or a zooming operation of the image capturing device.

15. The monitoring system according to claim 13, wherein the first information contains position information indicative of a position of the sensor, and the actual capturing area is selected based on the position information.

16. The monitoring system according to claim 13, wherein a preset capturing area corresponding to the sensor is selected as the actual capturing area.

17. The monitoring system according to claim 13, wherein the sensor senses and transmits second information, the receiver of the monitoring apparatus receives the second information, the transmitter of the monitoring apparatus transmits third control signal to close the shutter and fourth control signal to move the actual capturing area in accordance with the first information, and the image capturing device moves the actual capturing area after the shutter closes.

18. A method for controlling an image capturing device and a shutter in a monitoring system, the method comprising:

sensing first information by a sensor;

selecting, by a capturing area controller, an actual capturing area of the image capturing device in accordance with the first information;

aligning the image capturing device toward the selected actual capturing area and preparing capture an image in the selected actual capturing area of the image capturing device; and opening the shutter after the image capturing device is substantially aligned toward the selected actual capturing area enabling the image capturing device to capture the image in the selected actual capturing area.

19. The method according to claim 18, further comprising:

sensing third information by the sensor or another sensor;

controlling the shutter to be closed in accordance with the third information; and causing the image capturing device to move the actual capturing area after the shutter is controlled to be closed.

* * * * *